US008935182B2

(12) United States Patent
Cockrill et al.

(10) Patent No.: US 8,935,182 B2
(45) Date of Patent: Jan. 13, 2015

(54) ELECTRONIC COMMERCE USING A TRANSACTION NETWORK

(75) Inventors: Michael P. Cockrill, Redmond, WA (US); William K. Bryant, Seattle, WA (US); D. Chase Franklin, Seattle, WA (US); Mark H. McNeely, Mercer Island, WA (US); Timothy J. Ryan, Woodinville, WA (US); Andrew P. Sweet, Renton, WA (US); Steven J. Siadek, Seattle, WA (US); Ronald R. Faith, Jr., Bothell, WA (US); J. Mark Goris, Seattle, WA (US); Thor A. Malek, Sultan, WA (US)

(73) Assignee: Amdocs Qpass Inc., Seattle, WA (US)

( * ) Notice: Subject to any disclaimer, the term of this patent is extended or adjusted under 35 U.S.C. 154(b) by 2659 days.

(21) Appl. No.: 09/932,364

(22) Filed: Aug. 17, 2001

(65) Prior Publication Data
US 2003/0208442 A1 Nov. 6, 2003

Related U.S. Application Data

(62) Division of application No. 09/201,311, filed on Nov. 29, 1998, now Pat. No. 6,473,740.

(51) Int. Cl.
| | | |
|---|---|---|
| *G06Q 40/00* | (2012.01) | |
| *G07F 11/00* | (2006.01) | |
| *G06Q 20/04* | (2012.01) | |
| *G06Q 20/10* | (2012.01) | |
| *G06Q 20/12* | (2012.01) | |
| *G06Q 20/24* | (2012.01) | |
| *G06Q 30/06* | (2012.01) | |

(52) U.S. Cl.
CPC .............. *G07F 11/002* (2013.01); *G06Q 20/04* (2013.01); *G06Q 20/10* (2013.01); *G06Q 20/102* (2013.01); *G06Q 20/12* (2013.01); *G06Q 20/123* (2013.01); *G06Q 20/24* (2013.01); *G06Q 30/0601* (2013.01); *G06Q 30/0635* (2013.01); *G06Q 30/0641* (2013.01)
USPC ................................................ 705/39; 705/35

(58) Field of Classification Search
USPC ........................................................ 705/35–45
See application file for complete search history.

(56) References Cited

U.S. PATENT DOCUMENTS

| | | |
|---|---|---|
| 4,799,156 A | 1/1989 | Shavit et al. |
| 5,247,575 A | 9/1993 | Sprague et al. |

(Continued)

OTHER PUBLICATIONS

"Microsoft® Passport: A Single Name, Password and Wallet for the Web," Online (1999), http://www.passport.com.

(Continued)

*Primary Examiner* — Olabode Akintola
(74) *Attorney, Agent, or Firm* — Zilka-Kotab, PC

(57) ABSTRACT

The present invention is directed to a transaction network that facilitates and simplifies purchase transactions between any number of customers and any number of merchants. The transaction network is primarily utilized in the sale and purchase of digital content via a network such as the Internet. The transaction network registers and authenticates customer purchase activities and maintains customer account data including payment information. Once registered, a customer will generally not register again for further purchase activities at participating merchant sites. Additionally, the transaction network provides a single, central authentication mechanism for all participating merchant sites using a single customer identifier and password. Further, the transaction network accumulates purchase information across all of the merchant sites and the ultimate payment processing of those purchase transactions. Payment processing generally occurs on a periodic basis, enabling the accumulation of multiple purchase transactions within a participating customer's account. The network additionally preferably provides customers with centralized, automated services for customer account management, product refunds, subscription management, and multiple purchasing accounts linked to the same payment account.

8 Claims, 30 Drawing Sheets

(56) References Cited

U.S. PATENT DOCUMENTS

| | | | |
|---|---|---|---|
| 5,684,951 A * | 11/1997 | Goldman et al. | 726/6 |
| 5,684,965 A | 11/1997 | Pickering | |
| 5,710,887 A | 1/1998 | Chelliah et al. | |
| 5,715,314 A | 2/1998 | Payne et al. | |
| 5,794,217 A | 8/1998 | Allen | |
| 5,815,657 A | 9/1998 | Williams et al. | |
| 5,815,665 A * | 9/1998 | Teper et al. | 709/229 |
| 5,852,812 A | 12/1998 | Reeder | |
| 5,884,288 A | 3/1999 | Chang et al. | |
| 5,889,863 A | 3/1999 | Weber | |
| 5,893,077 A | 4/1999 | Griffin | |
| 5,943,656 A | 8/1999 | Crooks et al. | |
| 5,950,174 A | 9/1999 | Brendzel | |
| 5,963,915 A * | 10/1999 | Kirsch | 705/26.8 |
| 5,966,698 A | 10/1999 | Pollin | |
| 5,978,780 A * | 11/1999 | Watson | 705/40 |
| 5,993,047 A | 11/1999 | Novogrod et al. | |
| 6,006,205 A | 12/1999 | Loeb et al. | |
| 6,006,260 A * | 12/1999 | Barrick et al. | 709/224 |
| 6,016,484 A | 1/2000 | Williams et al. | |
| 6,029,151 A | 2/2000 | Nikander | |
| 6,038,548 A | 3/2000 | Kamil | |
| 6,047,268 A * | 4/2000 | Bartoli et al. | 705/35 |
| 6,070,185 A * | 5/2000 | Anupam et al. | 709/204 |
| 6,092,053 A | 7/2000 | Boesch | |
| 6,105,006 A | 8/2000 | Davis et al. | |
| 6,108,644 A | 8/2000 | Goldschlag et al. | |
| 6,138,142 A * | 10/2000 | Linsk | 709/203 |

OTHER PUBLICATIONS

A. R., "First USA Goes On-Line," Asset-Backed Securities Week, vol. 2, No. 28, p. 7 (Jul. 1, 1996).

Baker, Sharon, "In the Money—Qpass has big hopes for big Net sales," Puget Sound Business Journal, Online (Oct. 12, 1998), http://www.amcity.com/seattle/stories/1998/10/12/story3.html printed Mar. 30, 2000.

Cataldo, Maria and Webster, David C., "America On Line and First USA Premier the AOL Visa Card," PR Newswire (Jun. 26, 1996).

Quittner, Jeremy, "AOL Card from 1$^{st}$ USA Offers Time as a Bonus," American Banker, vol. 161, No. 125, p. 18 (Jul. 1, 1996).

Rafter, Michelle, "Micropayment Firms Seek New Ways to Cash In, " The Standard, Online (May 28, 1998), http://www.thestandard.com/article/display/0.1151.423,00.html printed May 30, 2000.

Sirbu et al., "NetBill—An Internet Commerce System Optimized for Network Delivered Services," IEE Personal Communications, vol. 2, No. 4, pp. 34-39 (Aug. 1995).

\* cited by examiner

Figure 7:
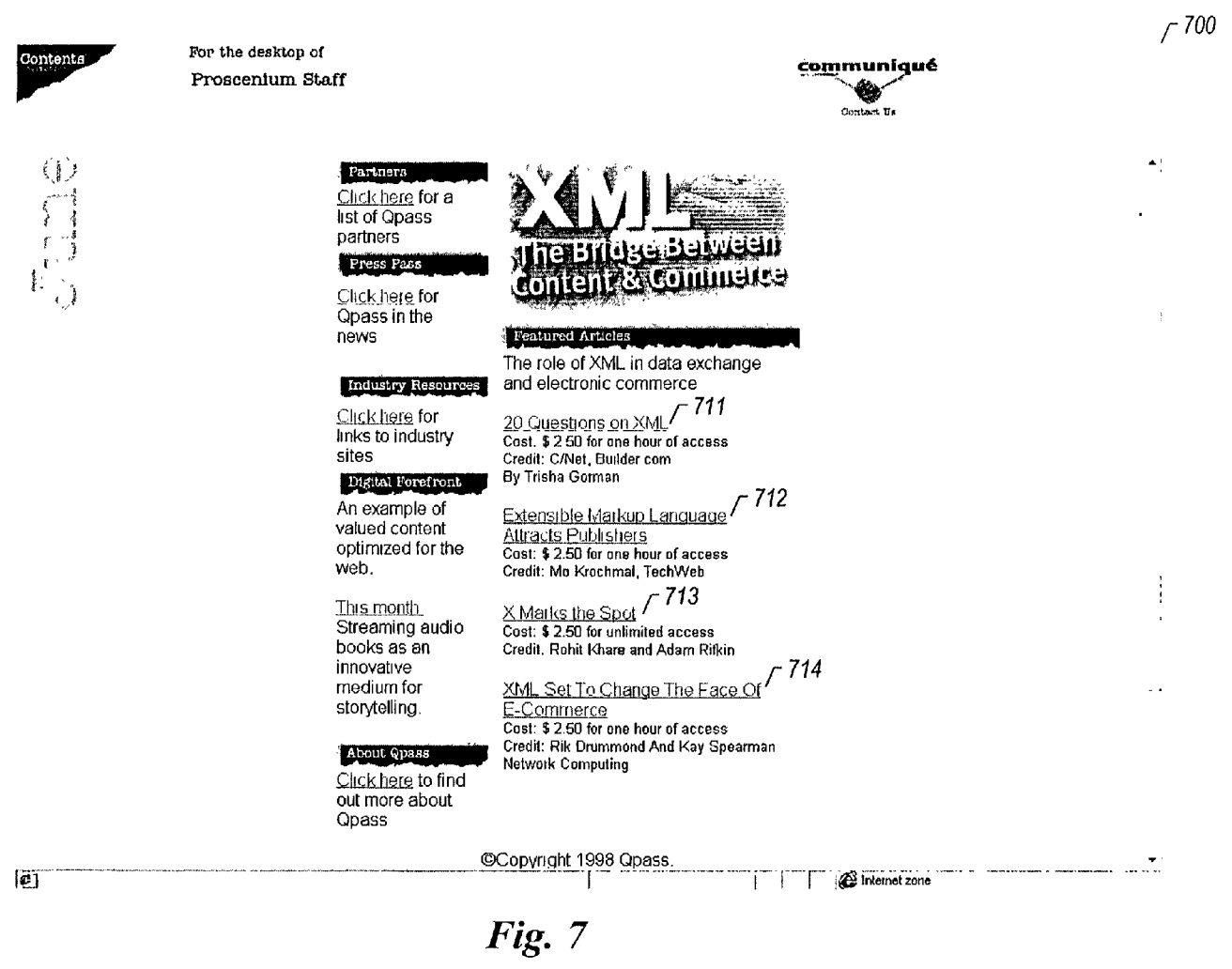

/— 700

For the desktop of Proscenium Staff communiqué
Contact Us

Contents qpass

Partners
Click here for a list of Qpass partners

Press Pass
Click here for Qpass in the news

Industry Resources
Click here for links to industry sites

Digital Forefront
An example of valued content optimized for the web.

This month: Streaming audio books as an innovative medium for storytelling.

About Qpass
Click here to find out more about Qpass

XML: The Bridge Between Content & Commerce

Featured Articles
The role of XML in data exchange and electronic commerce

20 Questions on XML  /— 711
Cost: $ 2.50 for one hour of access
Credit: C/Net, Builder.com
By Trisha Gorman Extensible Markup Language  /— 712
Attracts Publishers
Cost: $ 2.50 for one hour of access
Credit: Mo Krochmal, TechWeb X Marks the Spot  /— 713
Cost: $ 2.50 for unlimited access
Credit: Rohit Khare and Adam Rifkin XML Set To Change The Face Of  /— 714
E-Commerce
Cost: $ 2.50 for one hour of access
Credit: Rik Drummond and Kay Spearman
Network Computing ©Copyright 1998 Qpass.

Internet zone

Contents

For the desktop of
Proscenium Staff communiqué
Contact Us

Featured Articles

"20 Questions on XML"
C/Net, Builder.com
By Trisha Gorman
(3/10/98)

Nearly everyone is talking about XML (Extensible Markup Language) these days. But few understand what it's really all about.

XML's proponents claim it will cure everything that's wrong with HTML and enable the seamless exchange of data between different applications and operating systems. Indeed, most observers agree that XML is poised to cause a revolution in content delivery and exchange. And those of you who get it first will probably benefit the most.

If you've been dying to learn more about XML but have been unable to find the time to dig through all the technical specs and marketing hyperbole, we have the perfect answer: let BUILDER.COM do the digging for you. We've asked and answered the top 20 questions about XML, and while they may not make you an XML expert, we guarantee they'll give you a better appreciation of just what this technology has in store for Web builders.

1. What is XML?
2. Why is XML important?
3. How are SGML, HTML, and XML related?
4. How will XML be implemented?
5. What is a Document Type Definition (DTD)?

Internet zone

*Fig. 14*

Best Market Reports

[Home] [Search] [GLOBUS & NTDB] [E-mail]

- 1501 — Program Description
- 1502 — AGRICULTURAL CHEMICALS FY98
- 1503 — AGRICULTURAL EQUIPMENT FY98
- 1504 — AIR CONDITIONING/REFRIGER'N EQUIP FY98
- 1505 — AIRCRAFT AND PARTS FY98
- 1506 — AIRPORT/GROUND SUPPORT EQUIP FY98
- 1507 — APPAREL FY98
- 1508 — ARCHITECTURE/CONSTR/ENGINEER'G FY98
- 1509 — AUTOMOTIVE PARTS/SERVICE EQUIPMENT FY98
- 1510 — AUTOS AND TRUCKS FY98
- 1511 — BOOKS AND FILMS FY98
- 1512 — BUILDING PRODUCTS FY98
- 1513 — CHEMICAL AND PLASTICS PROD EQUIP FY98
- 1514 — CHEMICALS AND COMPOSITES FY98
- 1515 — COMMERCIAL AND PLEASURE BOATS FY98
- 1516 — COMPUTER SOFTWARE FY98
- 1517 — COMPUTERS AND BUSINESS EQUIP FY98
- 1518 — COMPUTER/INFORMATION SERVICES FY98
- 1519 — CONSTRUCTION EQUIPMENT FY98
- 1520 — COSMETICS AND TOILETRIES FY98
- 1521 — DEFENSE INDUSTRY EQUIPMENT FY98
- 1522 — DRUGS AND PHARMACEUTICALS FY98
- 1523 — EDUCATION/TRAINING FY98
- 1524 — ELECTRICAL POWER SYSTEMS FY98
- 1525 — ELECTRONIC COMPONENTS FY98
- 1526 — ELECTRONICS IND PROD/TEST EQUIP FY98

Previous Page    Next Page

*Fig. 15*

Best Market Reports

[Home] [Search] [GLOBUS & NTDB] [E-mail]

Program Description

AGRICULTURAL CHEMICALS F
AGRICULTURAL EQUIPMENT F
AIR CONDITIONING/REFRIGE
AIRCRAFT AND PARTS FY98
AIRPORT/GROUND SUPPORT E
APPAREL FY98
ARCHITECTURE/CONSTR/ENGI
AUTOMOTIVE PARTS/SERVICE
AUTOS AND TRUCKS FY98
BOOKS AND FILMS FY98
BUILDING PRODUCTS FY98
CHEMICAL AND PLASTICS PR
CHEMICALS AND COMPOSITES
COMMERCIAL AND PLEASURE
COMPUTER SOFTWARE FY98
COMPUTERS AND BUSINESS E
COMPUTER/INFORMATION SER
CONSTRUCTION EQUIPMENT F
COSMETICS AND TOILETRIES FY98
DEFENSE INDUSTRY EQUIPMENT FY98
DRUGS AND PHARMACEUTICALS FY98
EDUCATION/TRAINING FY98
ELECTRICAL POWER SYSTEMS FY98
ELECTRONIC COMPONENTS FY98
ELECTRONICS IND PROD/TEST EQUIP FY98

Purchase Confirmation

Your account will be charged $1.00 for unlimited access for the next 1 minutes to ELECTRICAL POWER SYSTEMS FY98.

☐ This is a business expense.

Thank you!

[Continue] [Cancel] — 1601

```
                                                                                          ┌─ 1700
ELECTRICAL POWER SYSTEMS FY98 BEST MARKET REPORTS USDOC, INTERNATIONAL TRADE
ADMINISTRATION
Product ID: 24

TITLE:                      ELECTRICAL POWER SYSTEMS FY98

SUBJECT COUNTRY(IES):       WORLD

POST OF ORIGIN:             COMMERCE

SERIES:                     BEST MARKET REPORTS (BMR)

ITA INDUSTRY CODE:          ELP, REQ

DATE OF REPORT (YYMMDD):    971027

DELETION DATE (YYMMDD):     991015

AUTHOR:

APPROVING OFFICER:

OFFICER'S TITLE:

NUMBER OF PAGES:            63

INTERNATIONAL COPYRIGHT, U.S. & FOREIGN COMMERCIAL SERVICE AND
U.S. DEPARTMENT OF STATE, 1997.  ALL RIGHTS RESERVED OUTSIDE OF
THE UNITED STATES

Best Market Report FY98:
                ELECTRICAL POWER SYSTEMS

ELECTRICAL POWER SYSTEMS

Countries included:

ARGENTINA
```

*Fig. 17*

| | Customer | Merchant | Item | Amount | Expiration | Outstanding |
|---|---|---|---|---|---|---|
| | | | | | | |
| | ⋮ | | | | | |
| 1811 | Jim | Customer News | Vacuum Rating Guide | US$ 3.00 | None | Yes |
| 1812 | Joe User | Content Partner | 20 Questions on XML | US$ 2.50 | 11/3/98 2:25 p.m. | Yes |
| 1813 | Joe User | Stat USA | Electrical Power Systems FX 98 | US$ 1.00 | 11/3/98 9:11 a.m. | Yes |
| 1814 | Sally Shopper | Recipeland | Dessert Recipes | US$ 3.00 | 12/21/98 10:00 a.m. | No |
| 1815 | Sally Shopper | Recipeland | Lunch Recipes | US$ 0.25 | 11/30/98 12:00 a.m. | No |
| 1816 | Sally Shopper | Item Publishing | Home Journal | US$ 0.25 | 11/1/99 12:00 noon | Yes |
| 1817 | Sally Shopper | Finance Data | General Electric Annual Report | US$ 7.75 | 11/1/99 12:00 p.m. | Yes |
| 1818 | Sally Shopper | Autoworld | Fuel Pump Repair | US$ 1.00 | 3/5/99 9:00 a.m. | Yes |
| 1819 | Sally Shopper | Autoworld | Tire Upgrade | US$ 1.25 | 12/1/98 11:18 am | Yes |
| 1820 | Sam Client | Horticulture Today | Renewal Chart | US$ 0.75 | 12/29/99 12:00 a.m. | Yes |
| | ⋮ | | | | | |

*Fig. 18*

┌─────────────────────────────────────────────────────────────────────────────┐
│ ⊙ | Member                                                                  │
│     Assistance Center                                                       │
│ Qpass                                                                       │
├─────────────────────────────────────────────────────────────────────────────┤
│ Qpass News │ Statements │ Subscriptions │ Membership │ Help                 │
├────────────┴────────────┴───────────────┴────────────┴────────────┐         │
│  Current Period  │  Past Periods  │            Account Status     │  ⎫     │
└──────────────────┴────────────────┴───────────────────────────────┘  ⎬ 2100│
                                                                       ⎭     │

Current Period - Transaction Summary

Click on the Product Name to see transaction details or to request a refund.

Member Name: Joe User (joeuser)

Current Balance: $3.50        Today's Date: 11/27/1998
                              Period End Date: 12/22/1998

Current Activity - Joe User

| Date  | Product Name | Amount | Credits Applied |
|-------|--------------|--------|-----------------|
| 11/27 | Content Partner  /2111 |  |  |  ⎫ 2110
|       | 20 Questions on XML | $2.50 |  | ⎭
| 11/27 | Stat USA /2121 |  |  |  ⎫ 2120
|       | Electrical Power Systems FX 98 | $1.00 |  | ⎭

Previous Balance

Previous balance              $0.00
11/27  Current Purchases       $ 3.50

Total Account Balance        $ 3.50   } 2130

Quick Tip: This statement reflects all transactions since the last billing date.

Questions about a transaction? Click on the product name to get more details.

Wondering how credits work? Any credits in your account will automatically be applied to your balance.

Sign Out

\* Business Expense
Click on the Product Name to see transaction details or to request a refund.

*Fig. 21*

Qpass

Member Assistance Center

Sign Out

| Qpass News | Statements | Subscriptions | Membership | Help |

Current Period | Past Periods | Account Status

Current Period - Transaction Detail

Qpass Colors

Date Purchased: 11/27
Content Provider: StatUSA
Product Name: Electrical Power Systems FX 98  ⎬ 2210
Business Expense: No
Price: $ 1.00
Amount Due: $ 1.00
Status: OK

2211

[ Return to Summary ]  [ Request Refund ]  — 2220

Copyright © 1998 Qpass Inc.

Current Period - Transaction Detail

Refund Request

You are requesting a refund for the following transaction:
Date Purchased: 11/27
Content Provider: Stat USA
Product Name: Electrical Power Systems FX 98
Price: $1.00

Please categorize the reason for requesting a refund:
[Didn't download correctly ▼] — 2320

Please enter a description of why you are requesting a refund:
[Only half the document downloaded correctly. The delivery was interrupted.] — 2330

[Submit Request] [Return to Summary]
        2340

Copyright © 1998 Qpass Inc.

Member Assistance Center
Qpass

Please complete this form and click Submit Request if you did not receive the correct content.

We will notify you by e-mail within 24 hours regarding your refund request.

Sign Out

Tabs: Qpass News | Statements | Subscriptions | Membership | Help
Current Period | Past Periods | Account Status 2300
2310

| Qpass News | Statements | Subscriptions | Membership | Help |
|---|---|---|---|---|
| Current Period | Past Periods | | Account Status | |

Member Assistance Center
Qpass

Current Period - Transaction Summary

Click on the Product Name to see transaction details or to request a refund.

Quick Tip: This statement reflects all transactions since the last billing date.

Member Name: Joe User (joeuser)

Questions about a transaction? Click on the product name to get more details.

Current Balance: $2.50    Today's Date: 11/27/1998
                          Period End Date: 12/22/1998

Wondering how credits work? Any credits in your account will automatically be applied to your balance.

Current Activity - Joe User

| Date | Product Name | Amount | Credits Applied |
|---|---|---|---|
| 11/27 | Content Partner <br> 20 Questions on XML | $2.50 | |
| 11/27 | Stat USA <br> Electrical Power Systems FX 90 <br> *Refund Pending* | $1.00 <br> -$1.00 | } 2521 |

} 2510

} 2520

Sign Out

Previous Balance

Previous balance        $0.00
11/27  Current Purchases  $2.50

Total Account Balance $2.50  } 2530

\* Business Expense
Click on the Product Name to see transaction details or to request a refund.

*Fig. 25*

| Member Assistance Center | Qpass News | Statements | Subscriptions | Membership | Help |
|---|---|---|---|---|---|
| Qpass | Current Period | Past Periods | Account Status | | |

Subscriptions

Click on a subscription to modify it.

Member Name: Joe User (joeuser)    Today's Date: 11/27/1998

Joe User

| Merchant | Item | Expiration Date | Renews Automatically |
|---|---|---|---|
| Wall Street Journal Publications | Wall Street Journal (2611) | 12/27 | no  } 2610 |
| Gardening Co. | Green Thumb Weekly (2621) | 6/15 | yes } 2620 |

Quick Tip: This statement reflects all transactions since the last billing date.

Questions about a transaction? Click on the product name to get more details.

Wondering how credits work? Any credits in your account will automatically be applied to your balance.

Sign Out (2600)

Group Accounts - Registration

First Name: Jean
Last Name: User
E-mail Address: jeanuser@aol.com
Member ID: Jean
Password: ********
Re-enter: ********
Town of Birth: New York

[Register Account] [Cancel]

Copyright © 1998 Qpass Inc.

Member Assistance Center
Qpass

Quick Tip: To add a member to a group membership, complete the form and click the Register Account button.

New group members will be e-mailed within 24 hours with information about their account.

Sign Out

Tabs: Qpass News | Statements | Subscriptions | Membership | Help
Profile | Payment | Password | Group Accounts 2800, 2810, 2820

*Fig. 28*

| Member Assistance Center | Qpass News | Statements | Subscriptions | Membership | Help |
| Qpass | Current Period | Past Periods | | | Account Status |

Current Period - Transaction Summary

Click on the Product Name to see transaction details or to request a refund.

Member Name: Joe User (joeuser)

Current Balance: $8.50     Today's Date: 11/28/1998     Period End Date: 12/22/1998

Current Activity - Joe User

| Date | Product Name | Amount | Credits Applied |
|---|---|---|---|
| 11/28 | Content Partner 20 Questions on XML | $2.50 | } 3010 |
| 11/28 | Stat USA Electrical Power Systems FX 99 | $1.00 | } 3020 |

Current Activity - Jean User

| Date | Product Name | Amount | Credits Applied |
|---|---|---|---|
| 11/28 | Ski Central Cascade Ski Report | $2.50 | } 3030 |
| 11/28 | Ski Central Olympic Ski Report | $2.50 | } 3040 |

Previous Balance

| | |
|---|---|
| Previous balance | $0.00 |
| 11/28 Current Purchases | $ 8.50 |

Total Account Balance $ 8.50    } 3050

Quick Tip: This statement reflects all transactions since the last billing date.

Questions about a transaction? Click on the product name to get more details.

Wondering how credits work? Any credits in your account will automatically be applied to your balance.

Sign Out

ELECTRONIC COMMERCE USING A TRANSACTION NETWORK

CROSS-REFERENCE TO RELATED APPLICATION

This application is a divisional application of Ser. No. 09/201,311, filed Nov. 29, 1998, now U.S. Pat. No. 6,473,740 and incorporated herein by reference.

TECHNICAL FIELD

The present invention is directed to the field of electronic commerce and more particularly, to the field of facilitating user registration and authentication, purchasing from multiple merchants, aggregating payment transactions, and merchant remittance for electronic commerce transactions, such as those conducted on the Internet.

BACKGROUND OF THE INVENTION

The World Wide Web ("the Web") is an interactive computer environment. The Web uses a collection of common protocols, including the Hypertext Transfer Protocol ("HTTP"), and file formats, including Hypertext Markup Language ("HTML"), to enable users to obtain information from or exchange information with a huge number of organizations, via the Internet, from virtually anywhere in the world. In order to establish a presence on the Web, organizations generally construct a "Web site." Such a Web site generally includes a collection of documents relating to the organization that is accessible by users using an address on the Web, called a Universal Resource Locator ("URL"), publicized by the organization.

The Web is increasingly used as a channel for commercial activity. Many organizations have achieved great success at selling products and services through their Web sites. For instance, a significant fraction of the airline tickets, music compact discs, and books sold today are sold via the Web.

In order to attract customers for such sales, a merchant must generally advertise its Web site on the Web or another more traditional media, or otherwise pay to attract customers. In most such sales, the purchase price is paid using a credit card or check card. In order to complete such a purchase, the customer provides to the merchant information associated with the credit card or check card, such as the number and expiration date of the credit card or check card. The customer commonly also provides additional information about himself or herself, such as name and postal address for delivering physical goods.

The merchant uses the provided credit card or debit card information to generate a request for payment of the purchase price, which it transmits to a payment processor. The payment processor in turn charges the purchase price to the customer's credit card or check card, and credits the merchant's account in the amount of the purchase price. For a particular customer, this process is generally repeated for each merchant from which the customer makes a purchase. Similarly, a merchant generally repeats this process for each purchase made by a customer.

The foregoing approach is efficient for purchases having a significant purchase price, such as those above US$ 20. However, because a significant portion of the actual costs of processing a credit card or check card transaction are fixed and not related to the amount of the transaction, processing credit card transactions for lower amounts is generally cost-prohibitive. As a result, credit card and check card transactions are generally not used to purchase goods and services having a relatively low price, such as those below US$ 20. Additionally, the high cost of providing customer service on the Internet, including such recurring operations as supplying lost passwords, raises the cost for selling goods, thus raising the minimum price at which goods must be sold to realize a profit.

While other forms of payment, such as cash proxies, have been proposed for use in such lower-priced transactions, these other forms of payment have failed to achieve acceptance on the Web. This is largely due to the amount of extra interaction that these cash proxy payment methods require from the customer, as customers are often unwilling to tolerate a great deal of inconvenience to purchase an inexpensive item. Moreover, even if such an alternative form of payment did achieve acceptance on the Web, they typically impose significant processing costs on those merchants that accept them, and do nothing to alleviate customer service costs.

Since credit card and check card transactions are the only forms of payment that have achieved general acceptance on the Web, it is generally not possible to buy such lower-priced goods and services on the Web. These lower-priced purchases are, however, important. In particular, digital goods, such as electronic magazine articles, music, or games, delivered via the Web have a very small marginal cost. While there may be a significant demand for some digital goods if priced at appropriately modest levels, when their price is set at or above the minimum viability threshold for credit card and check card transactions, demand is very low or nonexistent. Therefore, because goods cannot be sold via credit card or check card at a price below the minimum viability threshold, and there is little demand at or above the minimum viability threshold, such goods are incapable of generating significant revenue and generally are not offered for sale.

The transactional model discussed above, in which customers make purchases directly from merchants using credit card or check card transactions, have serious disadvantages for both customers and merchants. First, as noted above, low-priced purchases are generally impossible to conduct using this model, which generally precludes customers from purchasing and merchants from selling certain products, and limits the number of customers that can purchase others. Further, the model requires each customer to expend significant effort managing his or her relationship with each merchant, and also requires each merchant to make significant up-front and continuing investments in managing its relationship with its customers and with its payment processor.

FIG. 1 is a relationship diagram showing the relationships arising between customers, merchants, and payment processors in accordance with the conventional transaction model. The diagram shows a number of customers 110, who engage in purchase transactions with a number of merchants 120. Each line between a customer 110 and a merchant 120 represents a relationship between the customer and the merchant that must be managed by both the customer and the merchant.

From the customer's perspective, he or she must provide credit card or check card payment information to each new merchant from which the customer makes a purchase. To do so is generally both inconvenient, because the customer must enter the same information over and over, and disconcerting, because the customer is required to entrust this sensitive information to several different parties, one or more of which may be untrustworthy. In addition, customers must learn the customer service policies of every merchant from which they purchase, which can be a burdensome process, especially for modestly-priced purchases.

From the merchant's perspective, it must build, operate, and scale up an infrastructure for accepting credit or check card payments from customers, for delivering purchased goods, and for providing customer service to those customers. Such infrastructures are generally expensive, and often distract merchants from their more fundamental role of creating and selling products.

Further disadvantages arise in the conventional model when a merchant subjects customers to user authentication. Merchants often use user authentication, the process of establishing that a Web user is actually a returning customer, to enable customers to make subsequent purchases using the payment information from a previous purchase, or to facilitate continuing consumption of purchased goods, such as continued access to an online periodical to which the customer has purchased a subscription. Generally, in order to authenticate as a returning customer, a user must enter a user name and password that is specific to each merchant. From the customer's perspective, submitting to user authentication involves the disadvantages of having to use a user name that is unique among those of each merchant's customers and thus is not always freely chosen by the customer, having to remember or record each of these different member names, and having to re-authenticate each time the customers move from the Web site of one merchant to the Web site of another, which can prove burdensome and frustrating for users.

From the merchant's perspective, performing user authentication involves the disadvantages of having to build, operate, and scale up a mechanism for performing user authentication and a customer database to support user authentication, an effort that is potentially both costly and distracting. In addition to relationships with its customers, in the conventional model a merchant must also maintain a relationship with a payment processor 130 to process credit or check card transactions. Maintaining a relationship with a payment processor requires the merchant to shop for and negotiate a contract with a payment processor, and to build, operate, and scale up a mechanism for communicating with the payment processor, another effort that is potentially both costly and distracting.

It can be seen from the foregoing that, from the perspective of merchants, a reliable system for selling goods, including lower-priced goods on the Web, without having to develop an infrastructure for accepting payment, for registering and authenticating customers would have significant utility, or for providing customer support. It can further be seen that, from the perspective of customers, a convenient system that facilitates the purchase of goods, including lower-priced goods from a number of different merchants without having to submit payment information to each merchant or reauthenticate to each merchant, and which provides centralized customer service for purchases made from multiple merchants would also have significant utility.

SUMMARY OF THE INVENTION

The present invention provides a new type of transaction network ("the network") for facilitating purchase transactions between any number of customers and any number of merchants participating in the network. The network is well-suited to the purchase of low-priced "digital goods," as well as the purchase of other products and services, especially those having relatively low prices, and enables customer to use traditional forms of payment, such as credit cards. The network relieves merchants of the burdens of each maintaining a separate infrastructure for authenticating and accepting payment from customers, delivering goods, and providing customer service. The network further provides a single registration process during which the customer provides credit card payment information once for all of the merchants, as well as universal authentication to the Web sites of all of the merchants through a single user interaction. The network yet further facilitates the migration of large existing groups of users from other authentication systems, such as those of merchants, to the authentication system provided by the network. The network additionally preferably provides customers with centralized, automated services for customer account management, product refunds, subscription management, and multiple purchasing accounts linked to the same payment account.

FIG. 2 is a relationship diagram showing the relationships defined for customers and merchants by the network. It can be seen that each customer 210, rather than maintaining a separate purchasing relationship with each merchant 220, need only maintain a single purchasing relationship with the network 240. This means that the customer need only provide payment information and to register and authenticate to the network, not to each merchant. Similarly, each merchant 220, rather than maintaining a relationship with each customer 210, need only maintain a single relationship to the network. This means that, rather than providing infrastructure for accepting payment from customers, delivering goods to customers, registering and authenticating customers, and providing customer service, the merchants may rely upon corresponding functionalities of the network. Further, rather than themselves maintaining a relationship with a charge processor 230, the merchants 220 can rely on the relationship with the charge processor maintained by the network 240. Participation in the network thus frees both customers and merchants of the substantial burdens of the conventional transaction model described above.

In accordance with the present invention, a new customer may visit the Web site of any merchant. When the user selects, on the merchant's Web site, a product or service (hereafter "item") for purchase, the network determines whether the customer is presently registered and authenticated with the network. If the customer is not presently registered, the network enables the customer to register with the network by providing identity and payment information. The identity information provided by the customer preferably includes a member identifier and a password for use with the network, as well as an electronic mail ("email") address. The payment information preferably includes a credit card number, or other information usable to charge the customer for purchases. As part of registration process, the network preferably verifies the provided payment information. At the conclusion of registration process, the registered customer is permitted to purchase the item. As a result of the purchase, the purchased item is provided to the customer, and a transaction record is created that identifies the customer, the merchant, and the amount of the purchase. The visual user interfaces for these registration and purchase processes are preferably cobranded with the trademarks of the merchant and the operator of the network, to indicate that both parties are collaborating in providing the purchasing experience enjoyed by the customer.

After the customer has registered, the customer is effectively signed on to the network for a period of time, such as several hours. After registering, the customer may again sign on to the network by identifying, "or authenticating," himself or herself to the network by entering the member identifier and password. During the time that the customer is signed on, the customer may browse and purchase items from any Web site in the network without repeating the authentication process.

The network periodically reviews the unbilled purchase transaction records of each customer resulting from purchases made by the customer at any site. When the amounts of these records exceed a threshold value, preferably determined based upon the amount at which the transaction costs for the form of payment provided by the customer become reasonable, the network generates a payment request requesting payment of the total amount. The network then combines the payment requests generated for a number of users and transmits them to a payment processor for payment. The payment processor returns a settlement indication for each payment request indicating that the payment request has been settled or declined.

At this point, the merchants from whom the customer purchased the items are each credited with a portion of the corresponding purchase price, and the purchase transaction records represented by the payment request are marked as paid. In this manner, the network efficiently facilitates purchase transactions having relatively low purchase amounts using traditional forms of payment. The network further facilitates purchases having relatively low prices by providing centralized services for seeking refunds and managing subscriptions, and by providing multiple purchasing accounts linked to a single payment account. By providing these customer service functionalities to merchants, the network substantially lowers merchants' transaction processing costs, thereby enabling merchants to offer for sale modestly-priced goods.

In a further embodiment, during registration, the network permits the customer to provide a member identifier that is not unique among all of the customers of the network. In this embodiment, the network stores a unique identifier for the customer, along with the member identifier specified by the customer, in a cookie on the customer's computer system. When the customer subsequently authenticates by providing the member identifier, the network uses the member identifier to find the unique identifier on the customer's computer system, and uses the member identifier together with the unique identifier to authenticate the customer. In this way, the network allows customers to use non-unique member identifiers. This improves the customer experience for all customers, as it enables them to choose a particular member identifier without regard for its use by other customers. This is especially valuable where the network has a large number of customers. Facilitating non-unique member identifiers also permits the operator of the network to "absorb" or "import" existing groups of customers from other online services, where they already have member identifiers to which they are accustomed, and which may be redundant with the member identifiers of other customers of the network.

BRIEF DESCRIPTION OF THE DRAWINGS

FIG. 7 is a screen shot diagram showing a Web page displayed by a merchant.

FIG. 14 is a screenshot diagram showing provision of a purchased item.

FIG. 15 is a screenshot diagram showing a Web page of a second merchant.

FIG. 16 is a screenshot diagram showing the confirmation dialog displayed in response to the customer's selection of link 1524.

FIG. 17 is a screenshot diagram showing the provision of the additional purchased item.

FIG. 18 is a table diagram showing the transaction database maintained by the network.

FIG. 21 is a screenshot diagram showing a sample customer statement.

FIG. 22 is a screenshot diagram showing a sample item information page.

FIG. 23 is a screenshot diagram showing a sample refund request.

FIG. 25 is a screenshot diagram showing a sample statement reflecting the submission of a refund request.

FIG. 26 is a screenshot diagram showing a sample subscription management page.

FIG. 27 is a screenshot diagram showing a sample subscription information page.

FIG. 28 is a screenshot diagram showing a sample registration page for registering an additional purchasing account for an existing payment account.

FIG. 30 is a screenshot diagram showing a sample customer statement showing purchases made with multiple purchasing accounts that are each associated with the same payment account.

DETAILED DESCRIPTION OF THE INVENTION

The present invention provides a new type of transaction network ("the network") for facilitating purchase transactions between any number of customers and any number of merchants participating in the network. The network is well-suited to the purchase of low-priced "digital goods," as well as the purchase of other products and services, especially those having relatively low prices, and enables customer to use traditional forms of payment, such as credit cards. The network relieves merchants of the burdens of each maintaining a separate infrastructure for authenticating and accepting payment from customers, delivering goods, and providing customer service. The network further provides a single registration process during which the customer provides credit card payment information once for all of the merchants, as well as universal authentication to the Web sites of all of the merchants through a single user interaction. The network yet further facilitates the migration of large existing groups of users from other authentication systems, such as those of merchants, to the authentication system provided by the network. The network additionally preferably provides customers with centralized, automated services for customer account management, product refunds, subscription management, and multiple purchasing accounts linked to the same payment account.

Figure 1:
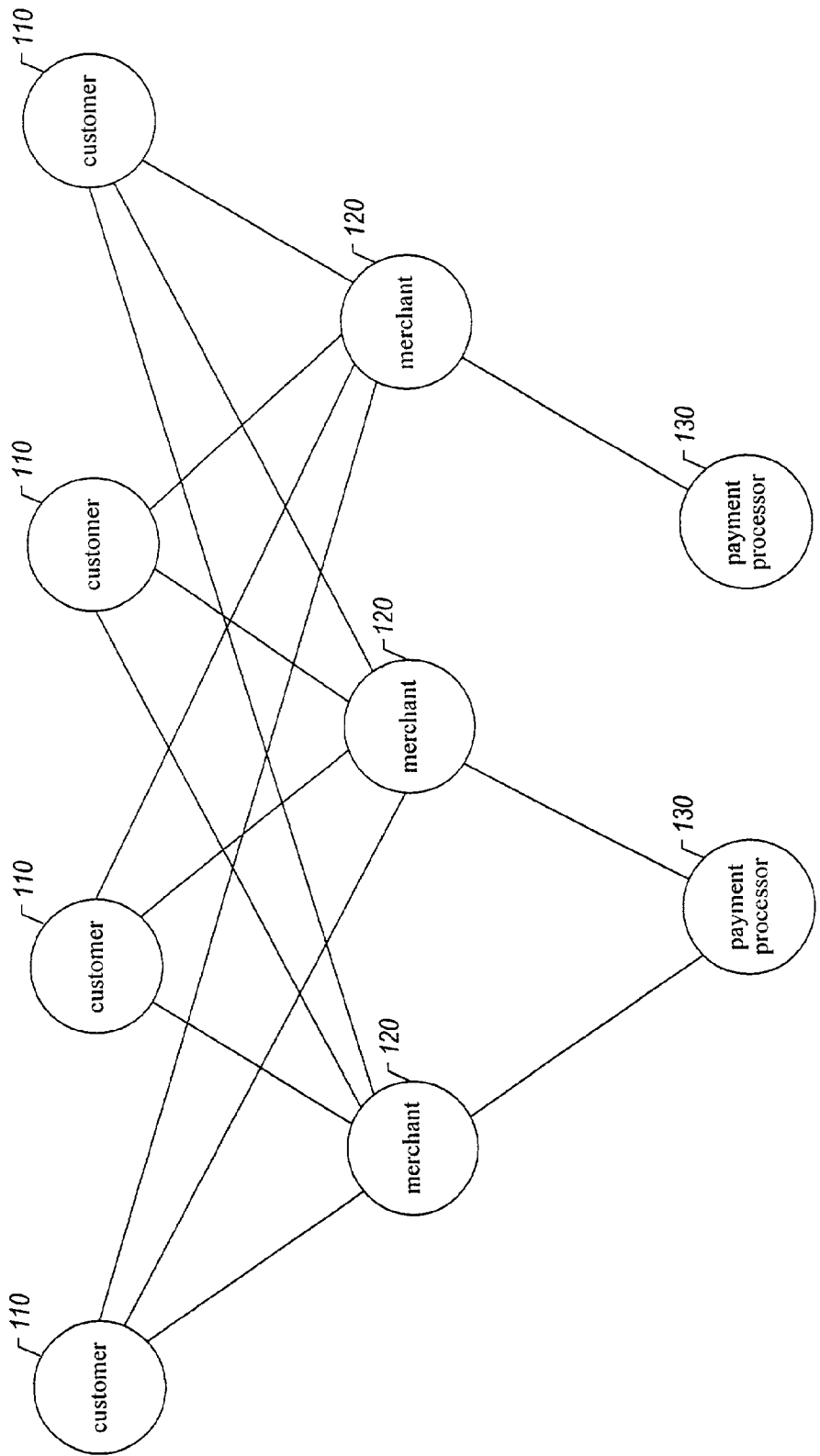
FIG. 1 is a relationship diagram showing the relationships arising between customers, merchants, and payment processors in accordance with the conventional transaction model.
Figure 2:
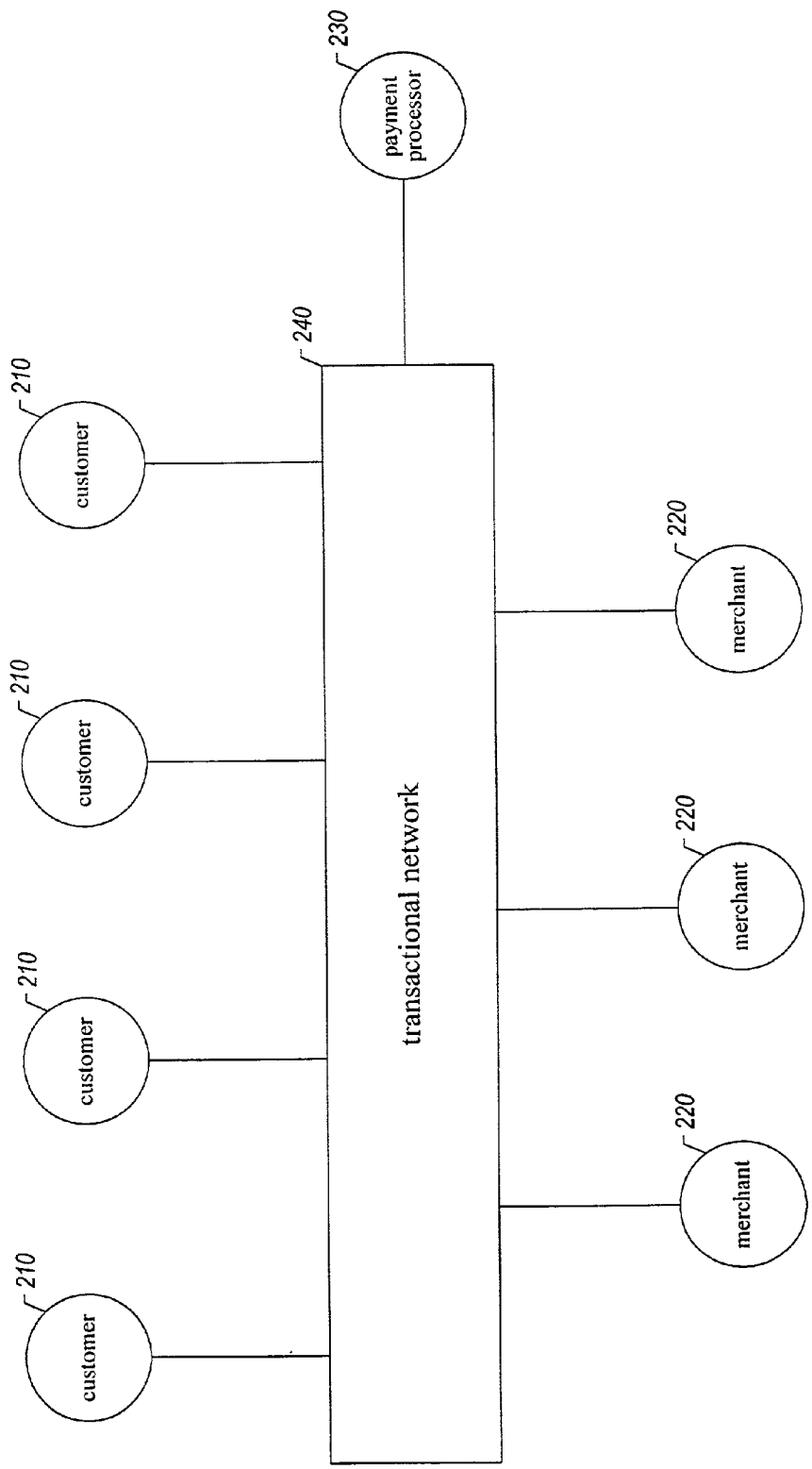
FIG. 2 is a relationship diagram showing the relationships defined for customers and merchants by the network.

FIG. 2 is a relationship diagram showing the relationships defined for customers and merchants by the network. It can be seen that each customer 210, rather than maintaining a separate purchasing relationship with each merchant 220, need only maintain a single purchasing relationship with the network 240. This means that the customer need only provide payment information to register and authenticate the network, not to each merchant. Similarly, each merchant 220, rather than maintaining a relationship with each customer 210, need only maintain a single relationship to the network. This means that, rather than providing infrastructure for accepting payment from customers, delivering goods to customers, registering and authenticating customers, and providing customer service, the merchants may relay upon corresponding functionalities of the network. Further, rather than themselves maintaining a relationship with a charge processor 230, the merchants 220 can rely on the relationship with the charge processor maintained by the network 240. Participation in the network thus frees both customers and merchants of the substantial burdens of the conventional transaction model described above.

In accordance with the present invention, a new customer may visit the Web site of any merchant. When the user selects, on the merchant's Web site, a product or service (hereafter "item") for purchase, the network determines whether the customer is presently registered and authenticated with the network. If the customer is not presently registered, the network enables the customer to register with the network by providing identity and payment information. The identity information provided by the customer preferably includes a member identifier and a password for use with the network, as well as an electronic mail ("email") address. The payment information preferably includes a credit card number, or other information usable to charge the customer for purchases. As part of registration process, the network preferably verifies the provided payment information. At the conclusion of registration process, the registered customer is permitted to purchase the item. As a result of the purchase, the purchased item is provided to the customer, and a transaction record is created that identifies the customer, the merchant, and the amount of the purchase. The visual user interfaces for these registration and purchase processes are preferably cobranded with the trademarks of the merchant and the operator of the network, to indicate that both parties are collaborating in providing the purchasing experience enjoyed by the user.

After the customer has registered, the customer is effectively signed on to the network for a period of time, such as several hours. After registering, the customer may again sign on to the network by identifying, "or authenticating," himself or herself to the network by entering the member identifier and password. During this time that the customer is signed on, the customer may browse and purchase items from any Web site in the network without repeating the authentication process.

The network periodically reviews the unbilled purchase transaction records of each customer resulting from purchases made by the customer at any site. When the amounts of these records exceed a threshold value, preferably determined based upon the amount at which the transaction costs for the form of payment provided by the customer become reasonable, the network generates a payment request requesting payment of the total amount. The network then combines the payment requests generated for a number of users and transmits them to a payment processor for payment. The payment processor returns a settlement indication for each payment request indicating that the payment request has been settled or declined.

At this point, the merchants from whom the customer purchased the items are each credited with a portion of the corresponding purchase price, and the purchase transaction records represented by the payment request are marked as paid. In this manner, the network efficiently facilitates purchase transactions having relatively low purchase amounts using traditional forms of payment. The network further facilitates purchases having relatively low prices by providing centralized services for seeking refunds and managing subscriptions, and by providing multiple purchasing accounts linked to a single payment account. By providing these customer service functionalities to merchants, the network lowers their transaction processing cost substantially, thereby enabling merchants to offer for sale modestly-priced goods.

In a further embodiment, during registration, the network permits the customer to provide a member identifier that is not unique among all of the customers of the network. In this embodiment, the network stores a unique identifier for the customer, along with the member identifier specified by the customer, in a cookie on the customer's computer system. When the customer subsequently authenticates by providing the member identifier, the network uses the member identifier to find the unique identifier on the customer's computer system, and uses the member identifier together with the unique identifier to authenticate the customer. In this way, the network allows customers to use non-unique member identifiers. This improves the customer experience for all customers, as it enables them to choose a particular member identifier without regard for its use by other customers. This is especially valuable where the network has a large number of customers. Facilitating non-unique member identifiers also permits the operator of the network to "absorb" or "import" existing groups of customers from other online services, where they already have member identifiers to which they are accustomed, and which may be redundant with the member identifiers of other customers of the network.

Figure 3:
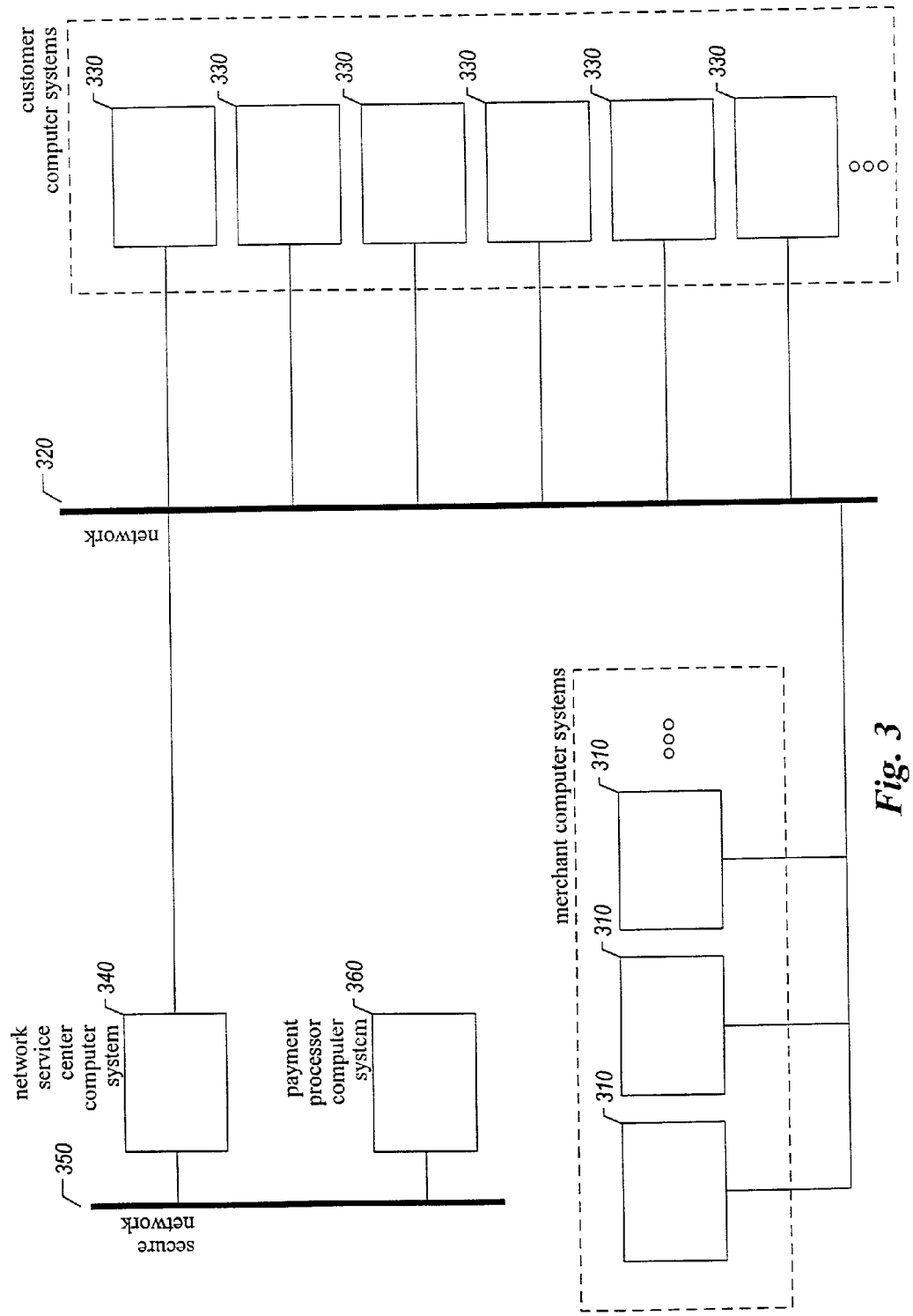
FIG. 3 is a high-level block diagram of the computer network environment in which the transaction network preferably operates.

FIG. 3 is a high-level block diagram of the computer network environment in which the transaction network preferably operates. Merchant computer systems 310 are computer systems operated by or on behalf of merchants that make items available for purchase by customers of the network. Merchant computer systems 310 preferably each provide a Web server that serves Web pages, some of which offer items for sale. The merchant computer systems 310 are connected to customer computer systems 330 via a network 320, such as the Internet. The customer computer systems 330 are usable by customers to browse the Web pages served by the merchant computer systems 310. When doing such browsing, a customer may use a customer computer system 330 to purchase an item offered for sale. Such purchase is communicated over the network 320 to a network service center computer system, which makes a record of the transaction. The network service center computer system 340 periodically collects together transactions entered into by each user, aggregates them into requests for payment, and forwards these payment requests over a secure network 350 to a payment processor computer system 360 for payment. The configurations of several of the computer systems shown in FIG. 3 are discussed below in conjunction with FIGS. 4-6. While the network is preferably implemented on computer systems configured in this manner, those skilled in the art will recognize that the network may be advantageously implemented on combinations of computer systems other than those shown in these figures.

Figure 4:
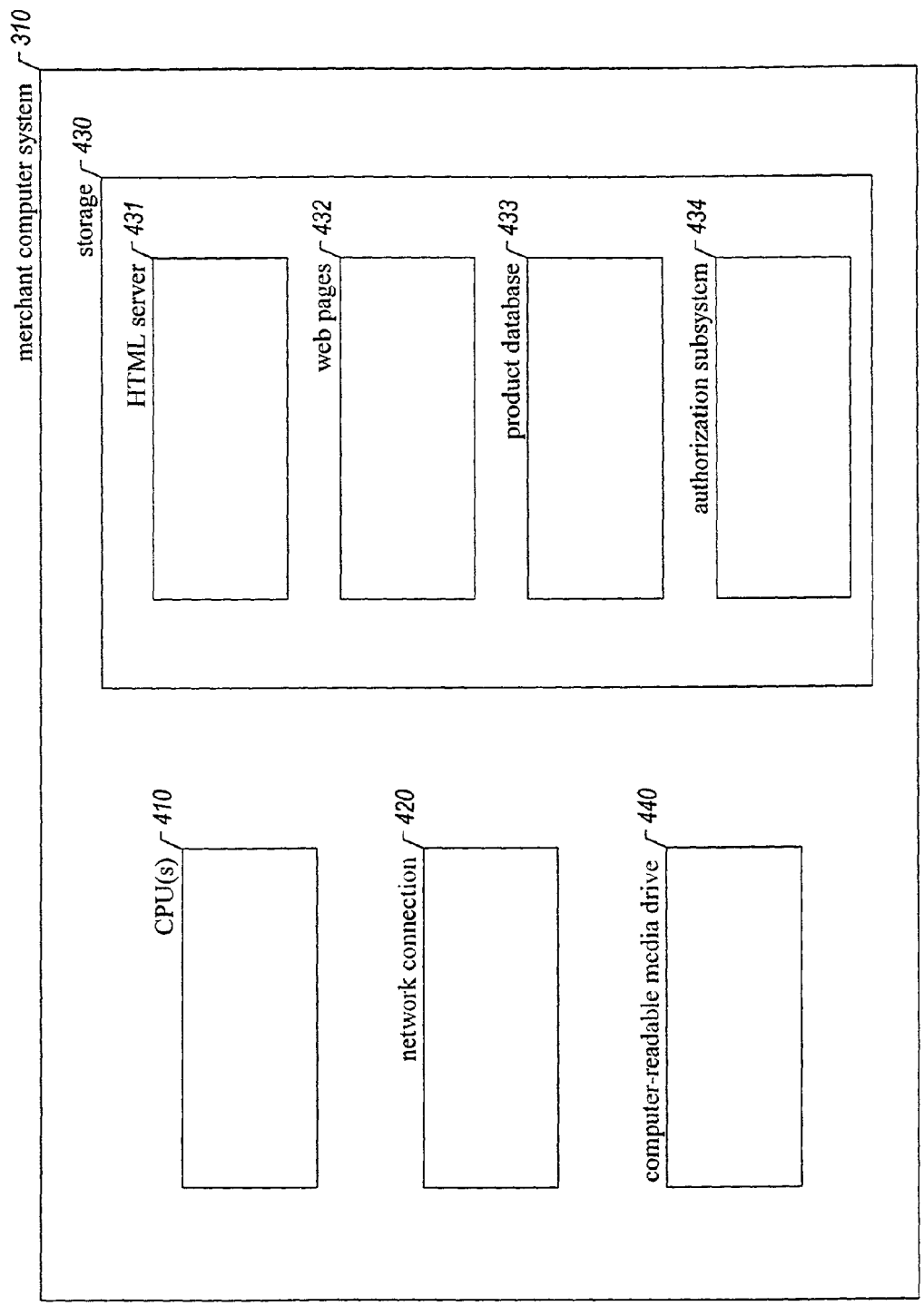
FIG. 4 is a high-level block diagram of a typical merchant computer system.

FIG. 4 is a high-level block diagram of a typical merchant computer system. The merchant computer system 310 includes one or more central processing units ("CPUs") 410, and a network connection 420 for connecting to the network 320. The merchant computer system further comprises computer storage 430, which may include both transient storage devices, such as random access memory, and persistent storage devices, such as hard drives. The storage preferably includes an HTTP server program 431 for serving Web pages 432 offering items for sale. The storage preferably also includes: a product database 433 for storing items offered for sale; a transaction engine 434 provided by the operator of the network to conduct the sale and delivery of items to authenticated customers and an authorization subsystem program 435, provided by the operator of the network to manage authorization of customers to the merchant Web site. The merchant computer system further includes a computer-readable media drive 440, which can be used to install software products, including the network, which are provided on a removable computer-readable medium, such as a CD-ROM or a DVD.

Figure 5:
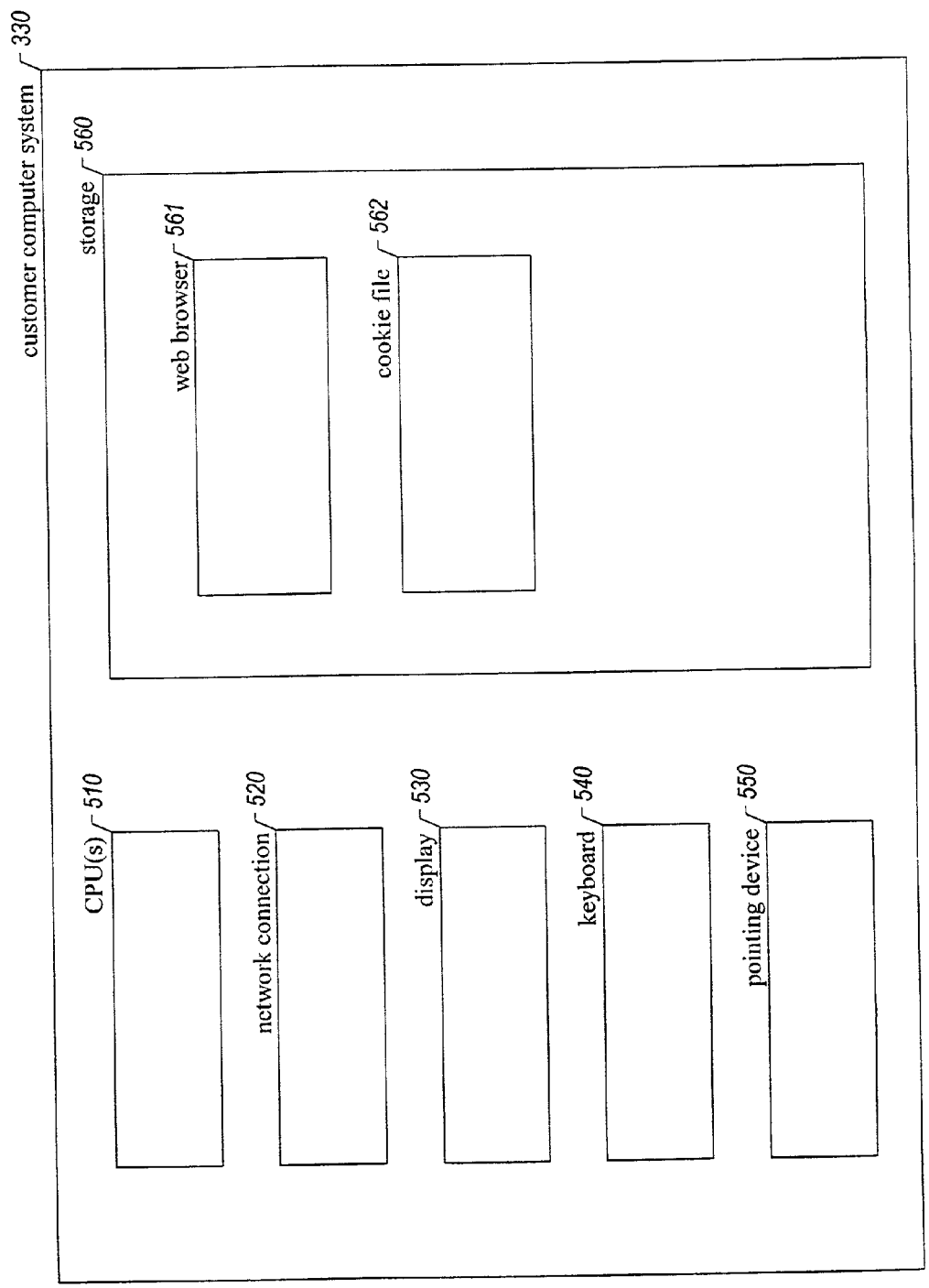
FIG. 5 is a high-level block diagram of a typical customer computer system.

FIG. 5 is a high-level block diagram of a typical customer computer system. The customer computer system 330 has one or more CPUs 510 and a network connection 520. The customer computer system further has a visual display 530, such as a video monitor for displaying Web pages, a keyboard 540 for inputting text, and a pointing device 550, such as a mouse, for selecting positions on the display. The customer computer system further includes transient and/or persistent storage 560 containing a Web browser program 561 for displaying and interacting with Web pages, and a cookie file 562 containing information stored on the customer computer system by Web servers and/or the network.

Figure 6:
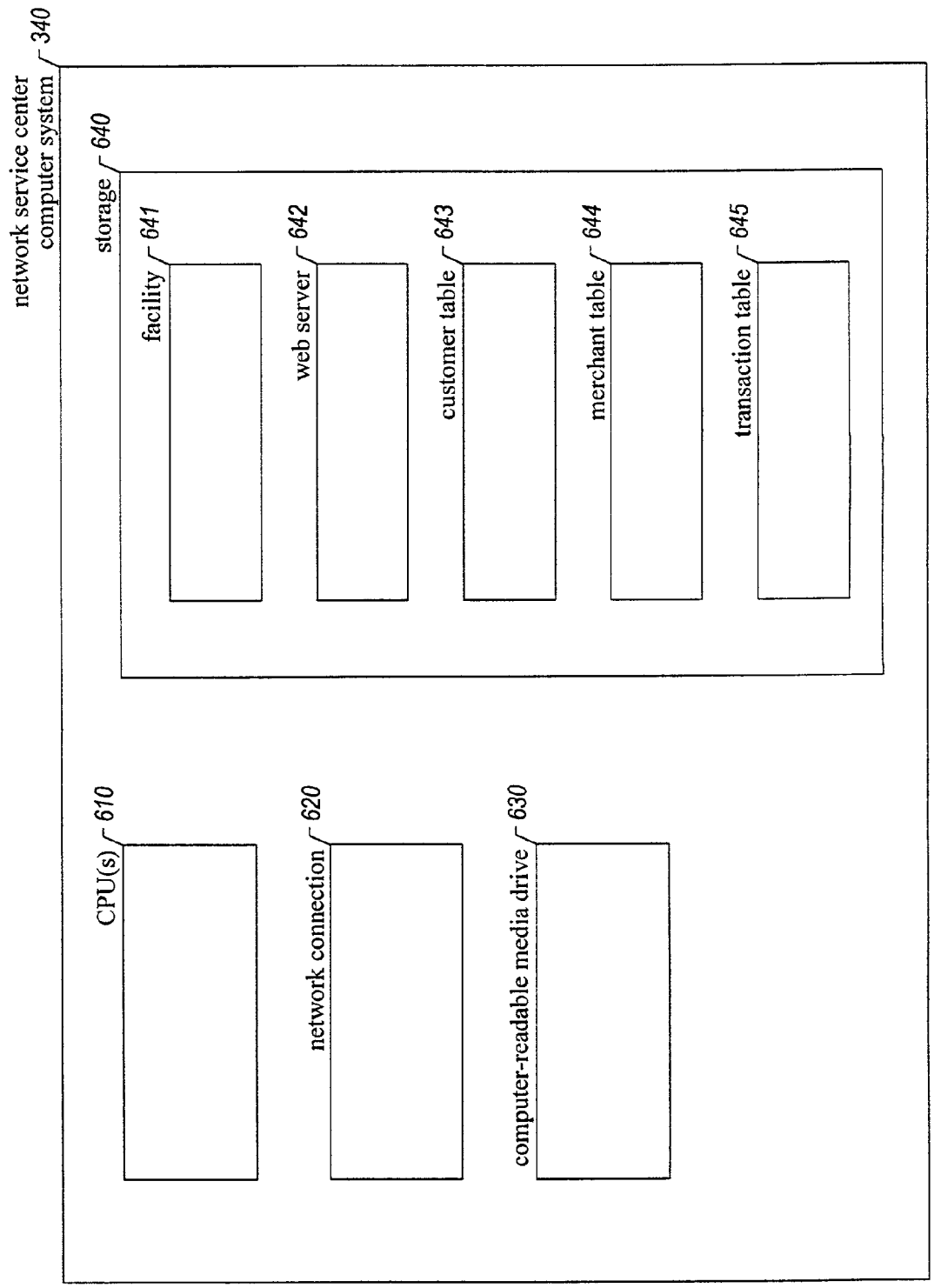
FIG. 6 is a high-level block diagram of a typical network service center computer system.

FIG. 6 is a high-level block diagram of a typical network service center computer system. The network service center computer system 340 has one or more CPUs 610, a network connection 620, and a computer readable media drive 630. The network service center computer system further includes transient and/or persistent storage 640 containing network service center software 641 for managing the record keeping associated with purchase transactions, an HTTP server 642 for serving Web pages, a customer database 643 for maintaining information on each customer of the network, a merchant database 644 for maintaining information about each merchant, and a transaction database 645 for maintaining information about transactions entered into between customers and merchants. While these tables, described in greater detail below, are each conceptually single tables, they may each be implemented using more than one table, or a combination of data structures of different types.

To more clearly illustrate the operation of the network, its operation is described herein in conjunction with an example of its use by a customer. FIG. 7 is a screen shot diagram showing a Web page displayed by a merchant. The Web page 700 includes information about the merchant, including information about products 711-714 that are offered for sale by the merchant. The information about each item includes a link that may be activated by the customer. For example, link 711 may be activated by the customer to purchase the item "20 Questions on XML." When the customer does so, the customer initiates the purchasing process.

Figure 8:
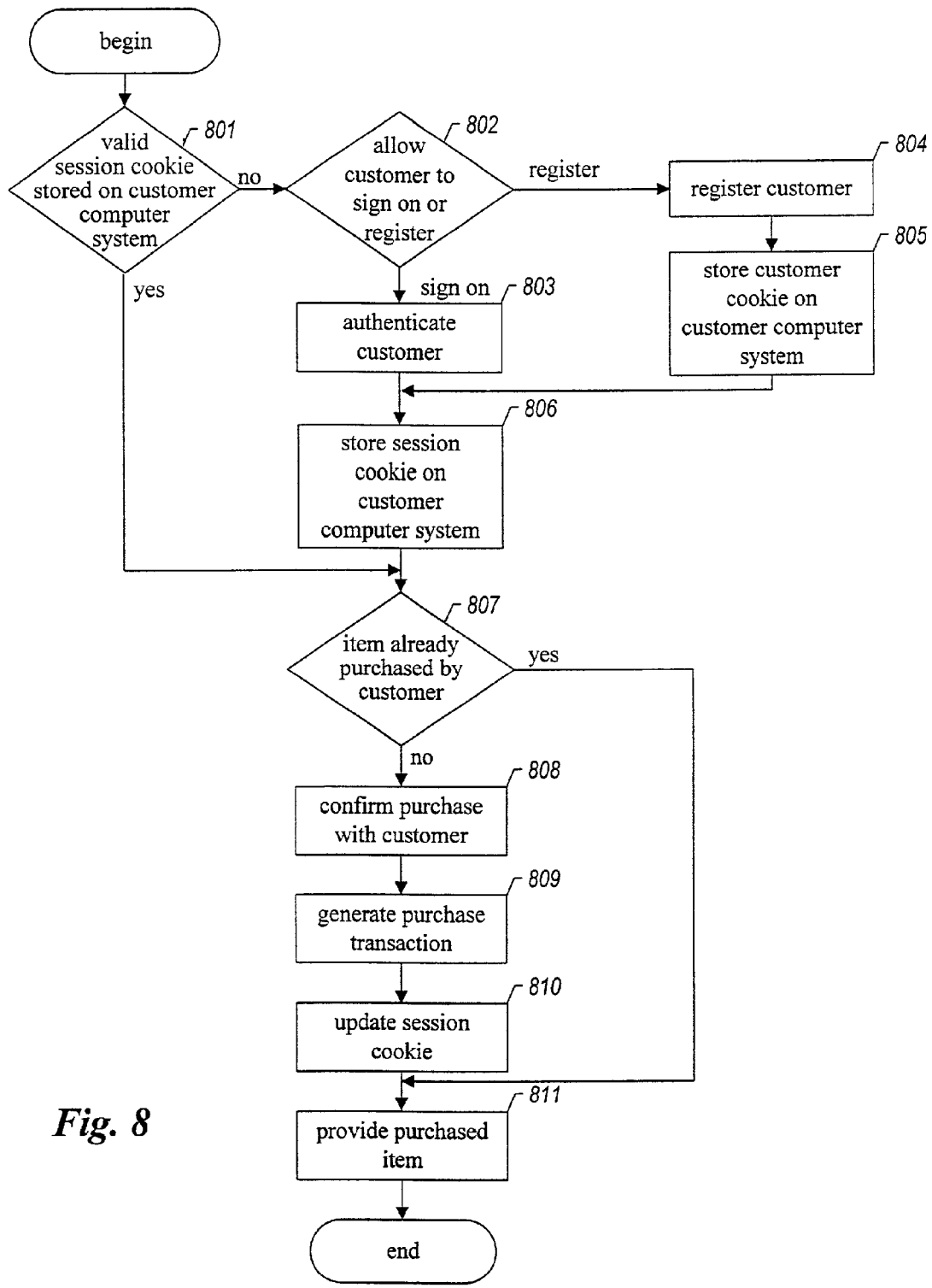
FIG. 8 is a flow diagram showing the steps preferably performed by the network as part of the purchasing process.

FIG. 8 is a flow diagram showing the steps preferably performed by the network as part of the purchasing process. These steps are preferably performed by network service center software executing on the network service center computer system and a transaction engine executing on the merchant computer system in conjunction with the Web browser executing on a customer computer system. Those skilled in the art will recognize, however, that these steps, as well as the other steps shown in flow diagrams herein, may also be distributed to other computer programs executing on other computer systems in accordance with alternate network configurations.

In step 801, the network determines whether a valid session cookie is stored on the customer computer system in its cookie file 562. If so, this indicates that the customer computer system is being used by a registered customer who has already signed on to the network, and the network continues in step 807. Otherwise, no registered user is currently signed onto the network from the customer computer system, and the network continues in step 802. Step 801 is preferably performed by examining time stamps in any network session cookies previously stored on the customer computer system by the network. These time stamps reflect the last time the customer signed on and the last time the customer made a purchase. The amount of time elapsed between these times stored in the cookie and the present time indicates whether each session cookie is presently valid. For example, the network may determine that a cookie indicating that the customer signed on less than six hours ago and completed his or her last purchase less than two hours ago is still signed onto the network, and that a network session cookie bearing those time stamps is valid.

Figure 9:
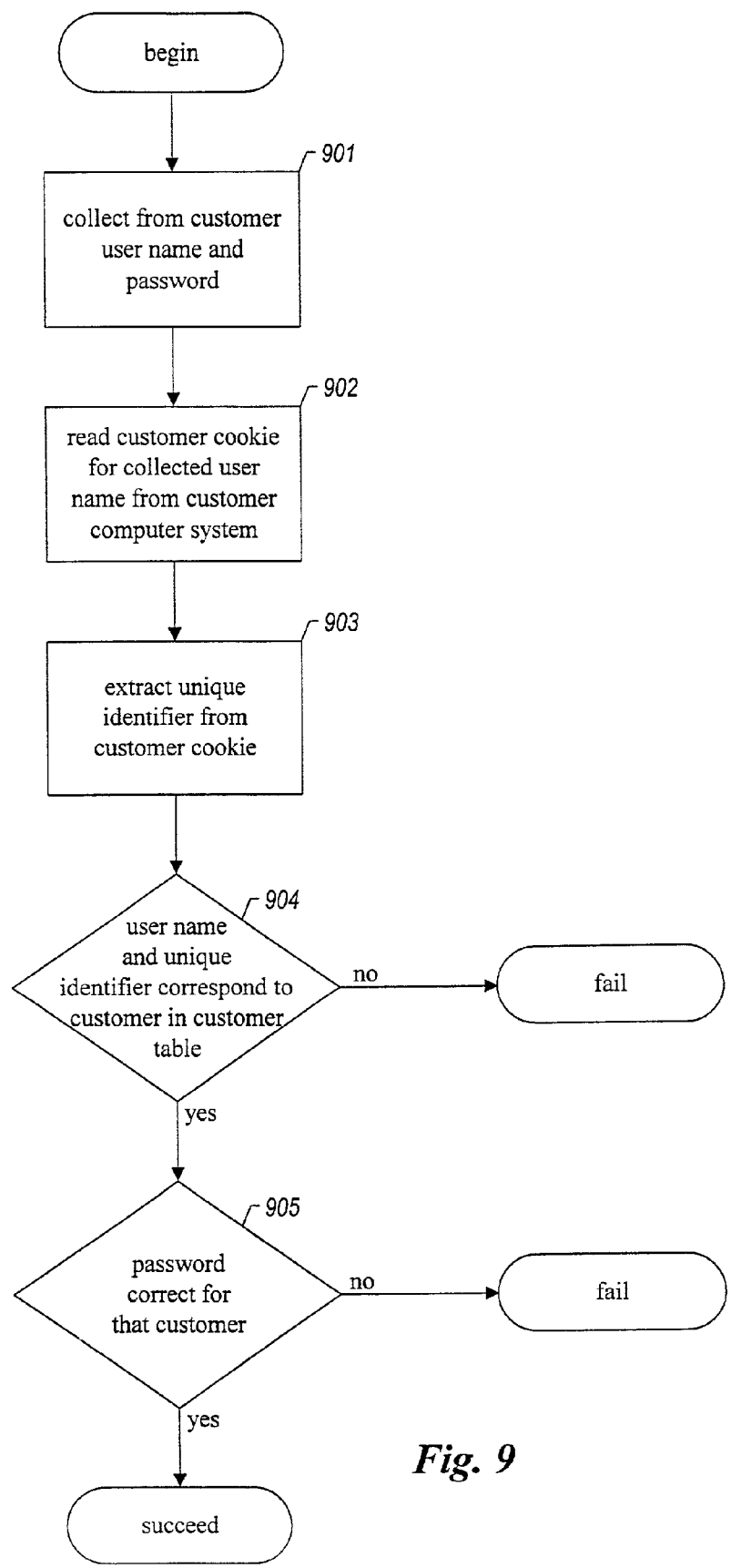
FIG. 9 is a flow diagram showing the steps preferably performed by the network in order to authenticate a customer.
Figure 10:
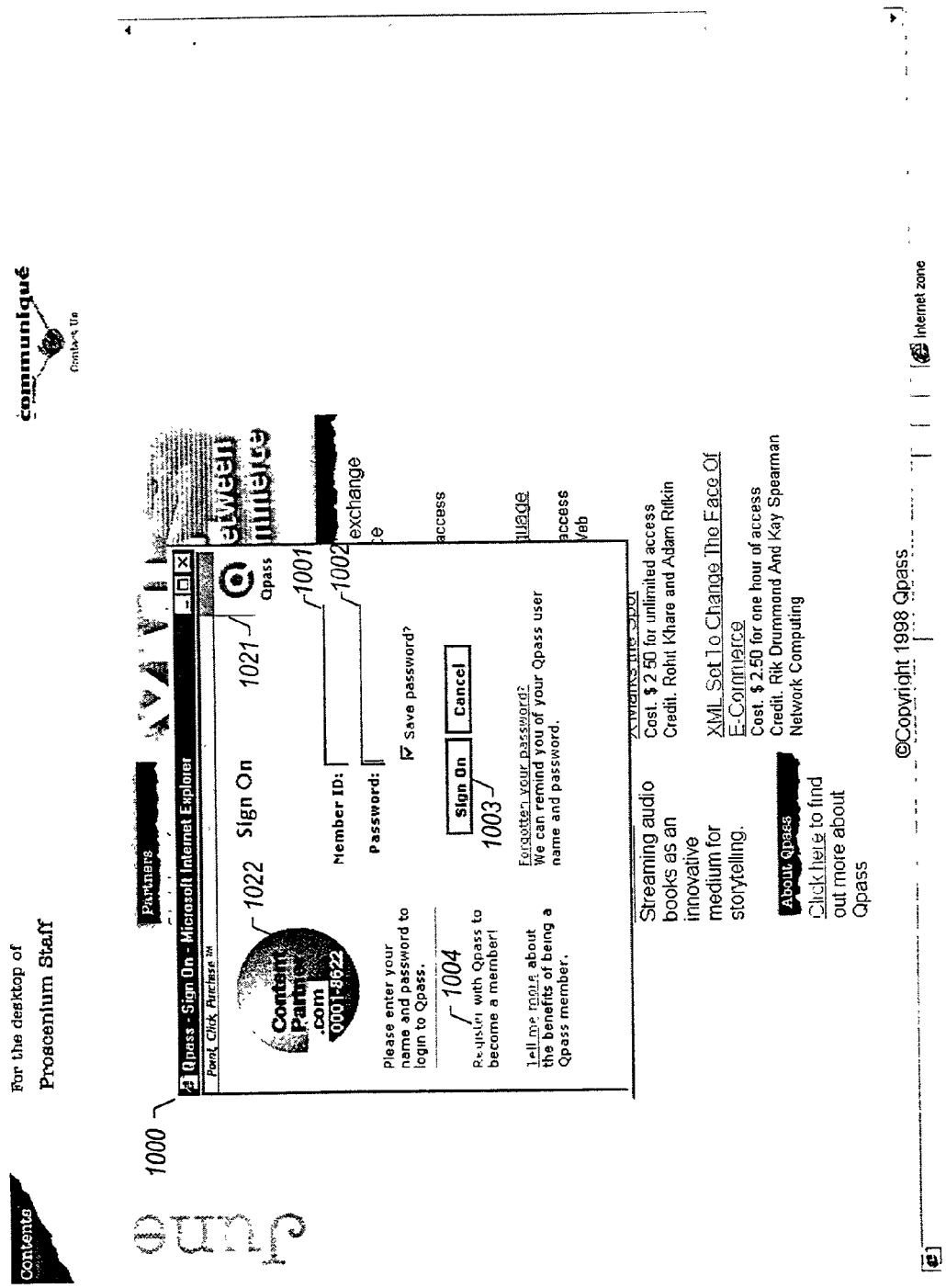
FIG. 10 is a screenshot diagram showing the sign on dialog preferably displayed by the network to collect the member identifier and password.

In step 802, if the customer is already registered with the network, the network permits the customer to sign on, and continues in step 803. If not, the network allows the user to register with the network, and continues in step 804. In step 803, the network authenticates the customer based on information provided by the customer as part of a sign on process. FIG. 9 is a flow diagram showing the steps preferably performed by the network in order to authenticate a customer. In step 901, the network collects from the customer the customer's member identifier and password. FIG. 10 is a screenshot diagram showing the sign on dialog box preferably displayed by the network to collect the member identifier and password. The sign on dialog box 1000 includes a member identifier field 1001 and a password field 1002, into which the customer may type his or her member identifier and password, respectively. The user then selects the sign on button 1003 to submit this information.

In step 902, the network also reads a customer cookie stored on the customer computer system for the collected member identifier. In step 903, the network extracts from the read customer cookie a unique identifier for the user stored in the customer cookie by the network. In one preferred embodiment, this unique identifier is the user's email address, or other information specific to the domain of the user. In step 904, if the combination of the collected user name and the extracted unique identifier correspond to a customer entry in the customer database, then the network continues in step 905, else authentication fails. In step 905, if the collected password is the correct password for that customer entry in the customer database, then authentication succeeds, else authentication fails.

Figure 11:
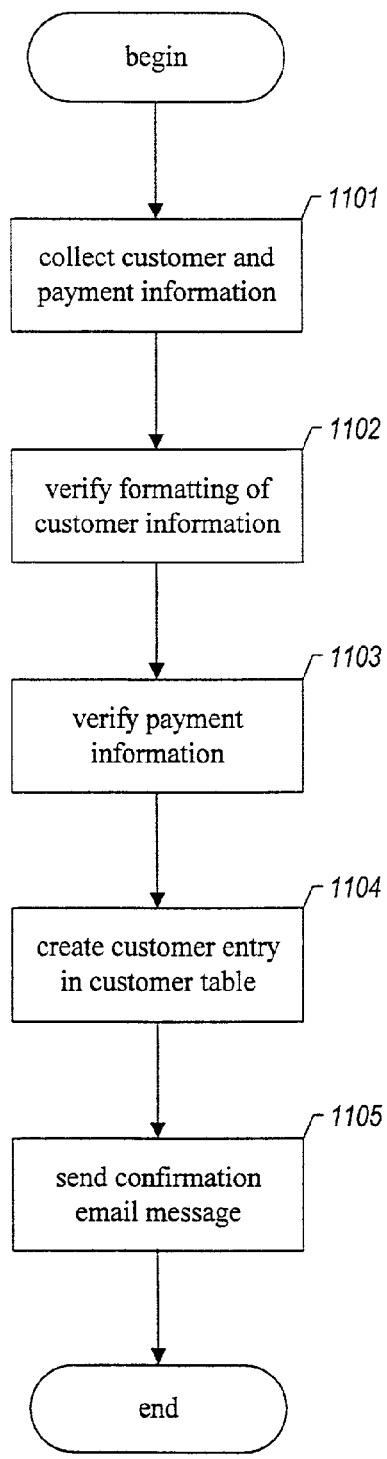
FIG. 11 is a flow diagram showing the steps preferably performed by the network in order to register the customer with the network.
Figure 12:
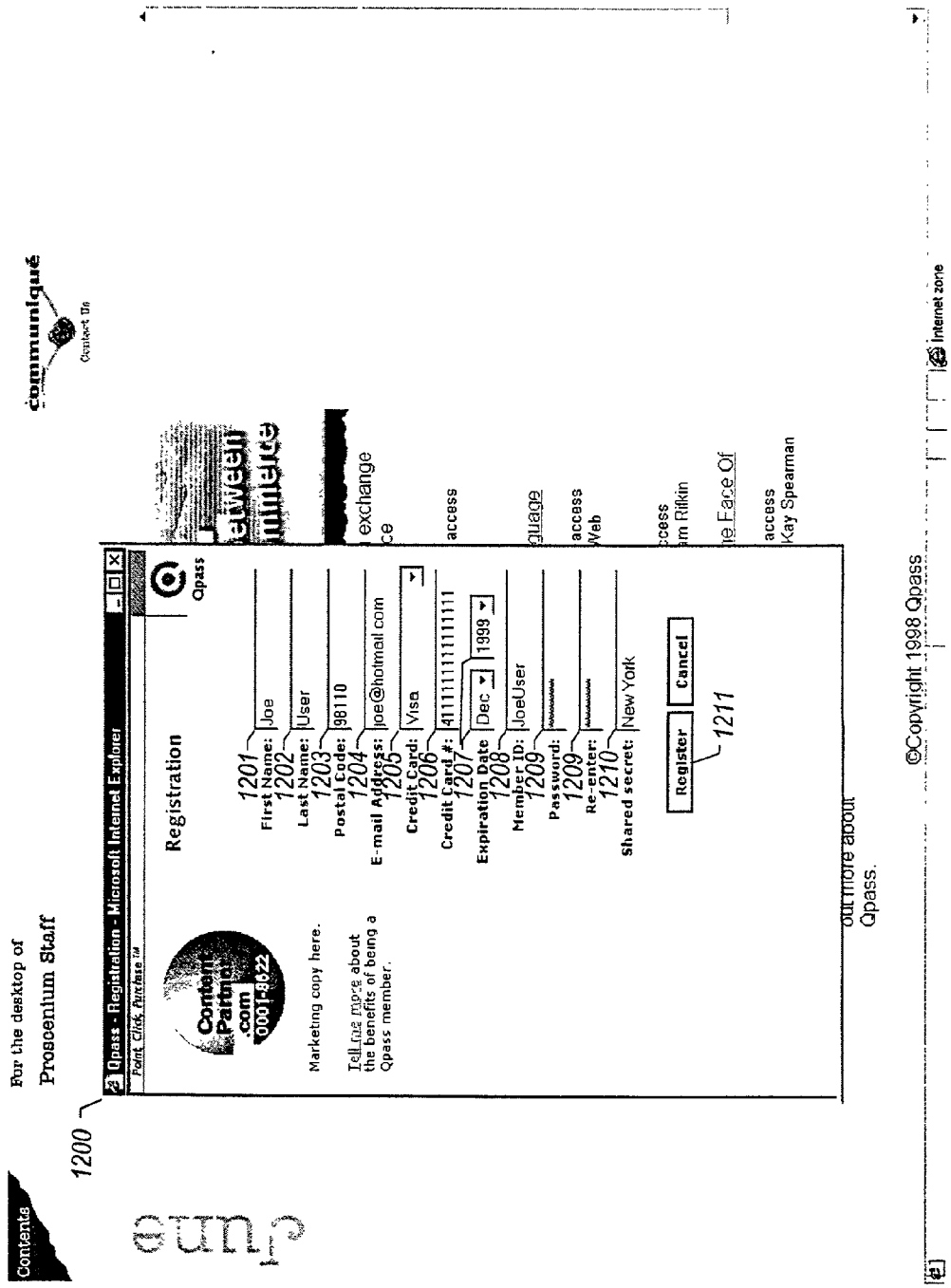
FIG. 12 is a screenshot diagram showing a registration dialog 1200, into which the user enters personal and payment information.

Returning to FIG. 8, in step 804, the customer has elected to register with the network by activating the register link 1004 in the sign on dialog box 1000. FIG. 11 is a flow diagram showing the steps preferably performed by the network in order to register the customer with the network. In step 1101, the network collects personal information about the customer, as well as payment information. The payment information preferably specifies a credit card account, but may alternatively specify any method of payment selected by the operator of the network. The collection process is shown in FIG. 12. FIG. 12 is a screenshot diagram showing a registration dialog 1200, into which the user enters personal and payment information. The user preferably fills in a first name field 1201, a last name field 1202, a postal code field 1203, an email address field 1204, a credit card type field 1205, a credit card number field 1206, a credit card expiration date field 1207, a member ID field 1208, password fields 1209, and a shared secret field 1210. It should be noted that the member ID 1208 may be any member identifier selected by the user, and does not need to be unique across the network. After completing fields 1200 through 1210, the user activates the register button 1211 to submit the information.

Returning to FIG. 11, in step 1102, the network verifies that the entered personal information is formatted correctly. For example, the network verifies that the zip code in the customer's address has the correct number of digits. If personal information formatting verification fails, the network preferably requests that the user input new, correctly-formatted personal information and repeats step 1102. In step 1103, the network verifies the entered payment information. In doing so, the network preferably determines whether the credit card number is valid, and whether the personal information collected matches the credit card number. As part of determining whether the credit card is valid and active, the network may further attempt to obtain authorization to charge a small amount to the credit card, to ensure that the credit card is active. The network may further utilize third party credit card verification or fraud detection services in performing step 1103. If verification of payment information fails, the network preferably requests that the user input new, valid payment information and repeats step 1103. In step 1104, the network creates an entry in the customer database for the customer containing the collected information. In step 1105, the network sends an email message to the customer announcing the customer's successful registration with the network. After step 1105, the steps conclude.

Figure 13:
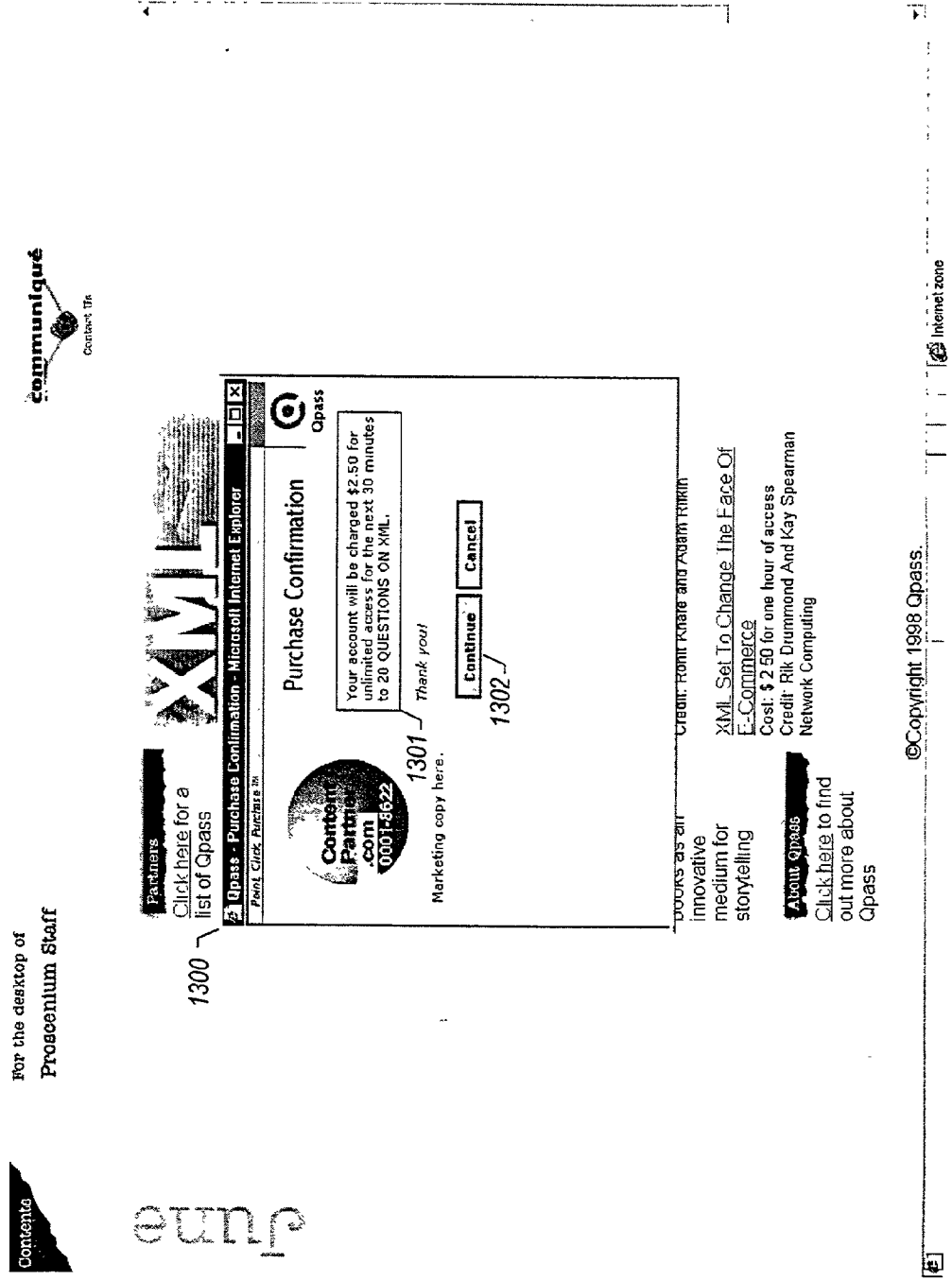
FIG. 13 is a screenshot diagram showing a confirmation dialog preferably displayed by the network in step 808.

Returning to FIG. 8, after registering the customer, in step 805, the network stores on the customer system a customer cookie identifying the customer by user name and unique identifier (preferably email address). In step 806, the network stores on the customer computer system a network session cookie documenting customer authentication. The network session cookie preferably includes the date and time of authentication. In step 807, the network determines whether the item selected by the customer has already been purchased by the customer. If so, the network continues in step 811 to provide the purchased item without charging the customer again. Otherwise, the network continues in step 808. In step 808, the network confirms the purchase with the customer. FIG. 13 is a screenshot diagram showing a confirmation dialog preferably displayed by the network in step 808. The confirmation dialog 1300 contains information 1301 about the purchase, including an identification of the item, the purchase amount, and the duration or expiration of the purchase. In order to complete the purchase, the customer activates the continue button 1302.

Returning to FIG. 8, in step 809, the network generates a purchase transaction, which it adds to its transaction database 645. In step 810, the network updates the network session cookie stored on the customer computer system to reflect the present time as the time of the last purchase. In step 811, the network provides to the user the purchased item. After step 811, these steps conclude.

FIG. 14 is a screenshot diagram showing provision of a purchased item. The Web page 1400 is the purchased item selected by activating link 711 on the merchant Web page, "20 Questions on XML." If the user leaves this Web page to continue browsing or turns off the customer computer system, the customer can revisit this purchased item during the duration of the purchase by again selecting its link from the merchant Web page. In response, the network immediately provides the purchased item without further interaction by the customer once the user is authenticated by the network.

After the customer is authenticated, the customer may complete additional purchases on the same or different merchant Web pages without reauthenticating. FIG. 15 is a screenshot diagram showing a Web page of a second merchant. The Web page 1500 lists items 1501-1526 available for purchase. The user may select link 1524 in order to select a market report item titled "Electrical Power Systems FY 98." After selection of this link, a confirmation dialog is immediately displayed without requiring the user to perform any authentication interactions.

FIG. 16 is a screenshot diagram showing the confirmation dialog displayed in response to the customer's activation of link 1524. Once the confirmation dialog box 1600 is displayed, the user need only select the continue button 1601 in order to complete the purchase of this additional item. After selecting this button, the "Electrical Power Systems FY 98" report is displayed. FIG. 17 is a screenshot diagram showing the provision of the additional purchased item. Web page 1700 contains the purchased "Electrical Power Systems FY 98" item.

As a result of each purchase transaction, the transaction engine creates a transaction record documenting the transaction, which is stored by the transaction engine at the merchant site. Periodically, a polling agent within the network service center software polls the transaction engine at each merchant site to retrieve any transaction records generated on that merchant's site. The polling agent, upon retrieving these transactions, stores them each as a row in a transaction database maintained by the network. The transaction records are preferably aggregated by the network periodically into payment requests, which are requests to a payment processor to charge the customer's credit card or other form of payment. FIG. 18 is a table diagram showing the transaction database maintained by the network. While the transaction table is shown for clarity as a single database table containing plain text, it will be appreciated by those skilled in the art that it may be advantageously implemented in a more heavily encoded and optimized form using conventional database techniques.

In the transaction table 1800, each row represents a transaction. Each row preferably contains data in at least six columns: a customer column 1801, a merchant column 1802, an item column 1803, an amount column 1804, an expiration column 1805, and an outstanding column 1806. The customer column preferably contains the member ID of the customer that entered into the transaction. For example, row 1812 contains the member identifier "Joe User." The merchant column identifies the merchant with which the customer entered into the transaction. For example, row 1812 lists the merchant "Content Partner." The item column 1803 preferably identifies the purchased item. For example, in row 1812, the item is the "Twenty Questions on XML" item. The price column 1804 preferably contains the amount of the purchased item. For example, in row 1812, the price is "US$ 2.50". The expiration column 1805 preferably contains the time at which the purchase expires. For example, for row 1812, the purchase expires at 2:25 p.m. on Nov. 3, 1998. Finally, the outstanding column 1812 indicates whether the customer has yet paid for the purchase. For example, in row 1812, the customer has not yet paid for the purchase, so the transaction is still outstanding.

Figure 19:
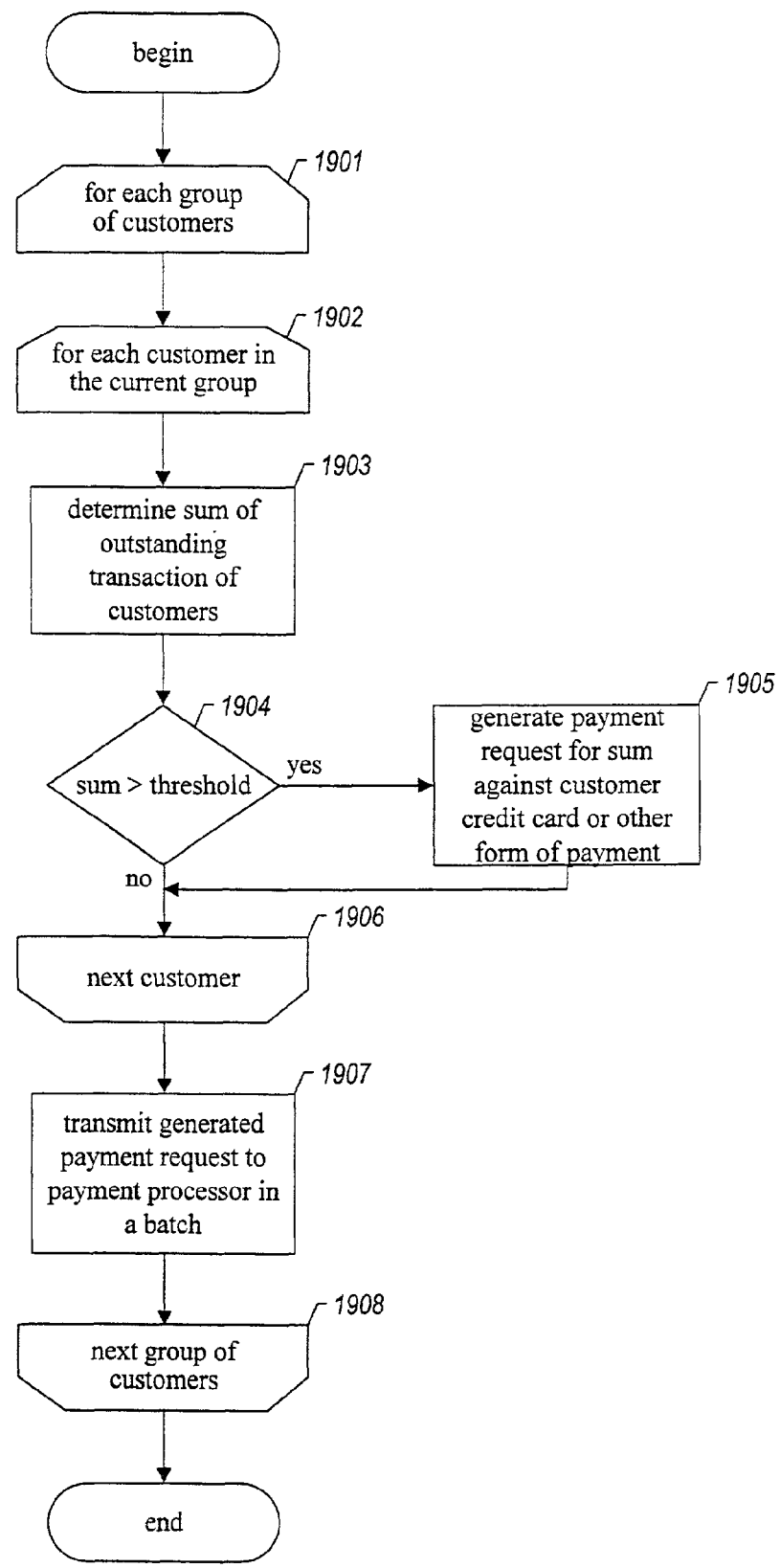
FIG. 19 is a flow diagram of the steps preferably performed by the network in order to aggregate the transaction records in the transaction database into authorizations sent to a payment processor.

FIG. 19 is a flow diagram of the steps preferably performed by the network in order to aggregate the transaction records in the transaction database into payment requests sent to a payment processor. The transactions are preferably aggregated monthly on each customer's monthly billing anniversary, but may be aggregated on any other desired schedule. In steps 1901-1907, the network loops through each of a plurality of groups of customers. In a preferred embodiment, there is a separate group of customers for each day of the month, and the loop of steps 1901-1907 is iterated once per day. In steps 1902-1905, the network loops through each customer in the group. In step 1903, the network determines the sum of the outstanding transactions of the customer. For example, for customer "Joe User" the network would add the amounts of rows 1812 and 1813, "US$ 2.50" and "US$ 1.00", to determine the sum of US$ 3.50. In step 1904, if the sum is greater than a billing threshold, such as US$ 4, then the network continues in step 1905, else the network continues in step 1906. In step 1905, the network generates a payment request for the determined sum against the credit card, or other form of payment, of the customer. In a preferred embodiment, the generated payment request has two parts: an authorization request, and a settlement request. The authorization request requests the authority to charge the amount, while the settlement request requests actual payment of the amount. In step 1906, if additional customers remain for processing, the network loops to step 1902 to process the next customer in the group. In step 1907, the network transmits the payment requests generated in step 1905 to a payment processor in a batch. In step 1908, each day, the network loops back to step 1901 to process the next group of customers.

Figure 20:
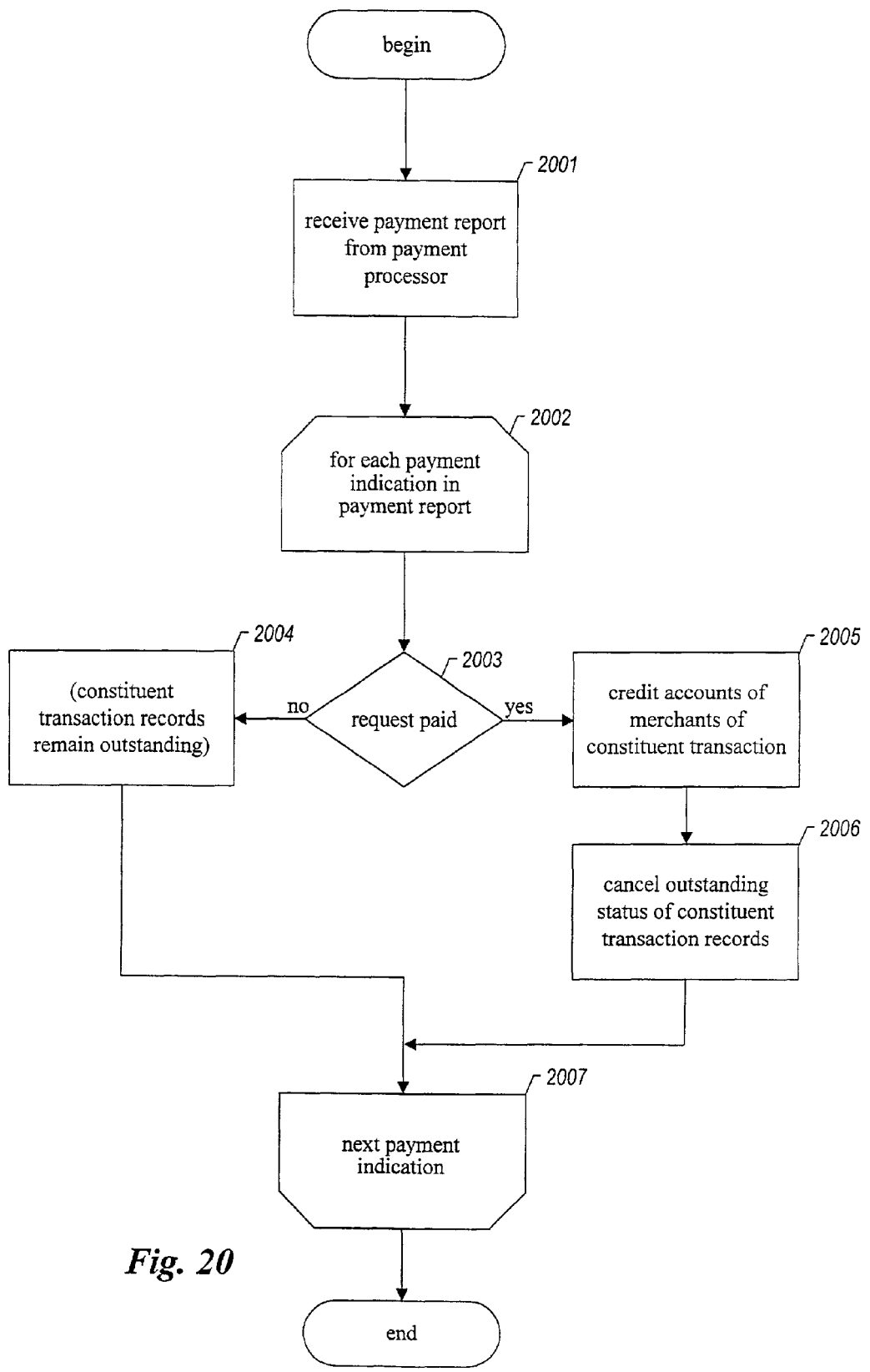
FIG. 20 is a flow diagram showing the steps preferably performed by the network in order to process a settlement report.

Generally, for each batch of payment requests transmitted to the payment processor, a payment report is received back from the payment processor indicating whether each of the payment requests was paid. FIG. 20 is a flow diagram showing the steps preferably performed by the network in order to process a payment report. In step 2001, the network receives the payment report from the payment processor. In steps 2002-2007, the network loops through each payment indication in the payment report. Each payment indication generally corresponds to a different one of the payment requests included in the batch. In step 2003, if the payment indication indicates that the corresponding authorization was paid by the payment processor, then the network continues in step 2005, else the network continues in step 2004. In step 2004, the network, through inaction, permits the constituent transaction records to remain outstanding. The network may also take further steps (not shown) to immediately resubmit the payment requests, or to cancel the account of the customer. After step 2004, the network continues in step 2007. In step 2005, the network credits the accounts of the merchants of the constituent transactions in accordance with the business arrangement between the merchants and the operator of the network. For example, the merchant "Stat USA" may have an arrangement with the operator of the network in which the merchant receives ninety percent of the amount of each purchase. Thus, for transaction record 1813, the merchant "Stat USA" would be credited in the amount US$ 0.90. In step 2006, the network cancels the outstanding status of the constituent transaction records so that they will not be incorporated in any future payment requests. In step 1907, if additional payment indications remain in the payment report, the network loops back to step 1902 to process the next payment indication. After step 2007, the steps conclude.

With respect to the steps shown in FIGS. 19 and 20 and discussed above, those skilled in the art will appreciate that, while these steps are directed primarily to forms of payment such as credit cards and check cards, these steps may be straightforwardly adapted to obtain payment from customers using different forms of payment.

In preferred embodiments, tasks relating to customer authentication and purchasing are allocated within the network as follows. Each item purchase link is preferably directed to a portion of the network called the transaction engine. A separate transaction engine is preferably located at each merchant site, so that, at any time that customers are able to access the merchant Web pages to initiate a purchase transaction, a version of the transaction engine is available to conduct the purchase transaction. The transaction engine reads and writes network session cookies. In order to do so, the transaction engines for all of the merchants are preferably registered within a single, central domain so that all of the transaction engines at all of the merchant sites may read and write the same cookies on the customer computer system. When an item purchase link is activated, the transaction engine checks for a valid network session cookie on the customer computer system, indicating that the customer has already been authenticated. If the transaction engine does not find a valid network session cookie, the transaction engine redirects processing to a customer information subsystem of the network. The customer information subsystem portion of the network performs authentication or registration for the customer, then instructs the transaction engine to confirm the transaction, generate a transaction record, write or refresh the network session cookie, and deliver the purchased item. To deliver the purchased item, in one embodiment, the transaction engine retrieves the data for the item from the merchant, and delivers the data for the item to the customer.

In another embodiment of the invention, in order to avoid the time and processing cost of relaying the data for the item through the transaction engine, rather than itself retrieving the data for the item, the transaction engine sends a request to the merchant computer system, through the customer computer system, to transmit the data for the item directly to the user. The request includes a "ticket"—an encrypted token attesting to the legitimacy of the request. At the merchant computer system, an authorization subsystem decrypts and verifies the ticket, creates a merchant session cookie that is similar to the network session cookie and that attests to the purchase and the authentication of the customer, and transmits the data for the item to the customer computer system.

Locating authorization subsystems at merchant computer systems also enables the network to manage customer authentication for merchants in their own domains. When a customer attempts to access a restricted portion of a merchant's Web site that is in a domain other than the central domain of the network, the authorization subsystem on the merchant computer system for that merchant checks to see whether a valid merchant cookie for that merchant is present on the customer computer system. Such a merchant cookie, if it is present on the customer computer system, attests to the current authentication of the user by the merchant. If a valid merchant cookie for that merchant is present on the customer computer system, the authorization subsystem allows access to the restricted portion of the merchant's Web site. If not, the authorization subsystem contacts the transaction engine. If the transaction engine finds a valid network session cookie on the customer machine—that is, a cookie attesting to the authentication of the customer in the central domain—it instructs the authorization subsystem to write a merchant session cookie and permit access to the restricted portion in the merchant's domain.

In a manner similar to the purchase process, if the transaction engine does not find a network session cookie on the customer machine, the transaction engine redirects processing to the customer information subsystem of the network. The customer information subsystem portion of the network performs authentication or registration for the customer, then instructs the transaction engine to create a network session cookie to the customer computer system. The transaction engine further instructs the authorization subsystem to write a merchant session cookie and permit access to the restricted portion. In this way, the network provides a common method for signing onto the Web sites of all of the merchants, even those with restricted portions outside of the central network domain. Further, a customer may visit restricted areas of several different merchants, and is only required to sign on once.

In addition to some or all of the foregoing features, the network additionally preferably provides customers with centralized, automated services for account management, product refunds, subscription management, and multiple purchasing accounts linked to the same payment account.

FIGS. 21-25 illustrate the automated product refund service preferably provided by the network. FIG. 21 is a screenshot diagram showing a sample customer statement. The statement 2100 contains entries, such as entries 2110 and 2120, each containing information about an item purchased by the customer named "Joe User." For example, entry 2120 in the statement contains information about the "Electrical Power Systems FX 98" report purchased from "Stat USA." The statement further includes the current balance 2130 for this account.

Each entry includes a link for displaying additional detail about the purchased item. For example, entry 2120 includes link 2121, which the user may activate to display additional information about the Stat USA report. FIG. 22 is a screenshot diagram showing a sample item information page. The item information page 2200 includes information 2210 about the item. This information includes a link 2211 that can be activated to access the purchased item. The item information page also includes a button 2220 that can be activated to request a refund for the item. A customer may wish to request a refund, for example, if the item was ordered by mistake, if the item does not conform to the customer's expectations or if the item could not be properly downloaded.

Figure 24:
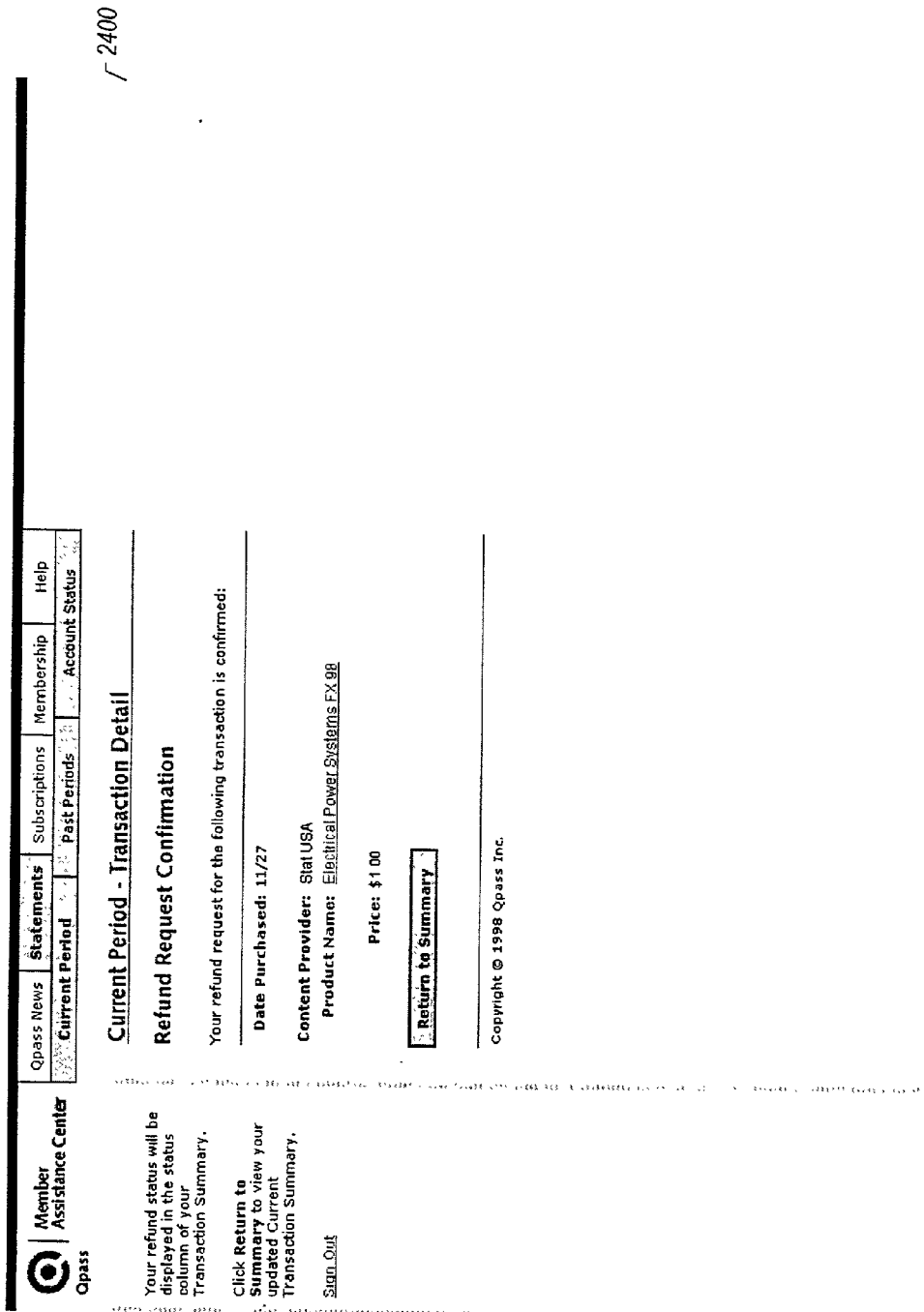
FIG. 24 is a screenshot diagram showing a sample confirmation screen confirming a refund request.

FIG. 23 is a screenshot diagram showing a sample refund request. The refund request 2300 is displayed in response to the customer's activation of button 2340. The refund request contains information 2310 about the item for which a refund is sought, a listbox 2320 for specifying a reason for the refund request, and a field 2330 for entering a further explanation of the circumstances surrounding the request for refund. The refund request further contains a button 2340 that can be activated to submit the refund request. FIG. 24 is a screenshot diagram showing a sample confirmation screen confirming a refund request. The confirmation screen 2400 is preferably displayed in response to the activation of button 2340.

After the refund request is submitted, the customer's statement is preferably updated to reflect the submission of the refund request. FIG. 25 is a screenshot diagram showing a sample statement reflecting the submission of a refund request. The updated statement 2500 includes a line 2521 indicating that a refund has been requested for item 2520. Line 2521 further indicates that the price of item 2520, $1.00, is being deducted from the account balance while the refund request is being considered. As a result, the account balance 2530 is reduced to include only the price of item 2510.

In processing refund requests, the network preferably employs a maximum automatic refund threshold. If a refund request is directed to an item having a price that is less than the maximum automatic refund threshold, the network preferably automatically grants the refund request. On the other hand, the network applies a more rigorous evaluation process to refund requests that are directed to items having prices greater than the maximum automatic refund threshold. The network preferably forwards such refund requests to a human customer service representative. This use of a maximum automatic refund threshold reflects a recognition that evaluation by a human customer service representative may incur a significant cost that, in many cases, exceeds the cost of granting the refund. In a preferred embodiment, the maximum automatic refund threshold is set at $10.00. As a result, a customer may conveniently complete the submission of a refund request without interacting directly with a human customer service representative. Further, in most cases, the network relieves its operator of any need to expend customer service representative time to process refund requests.

Figure 27:
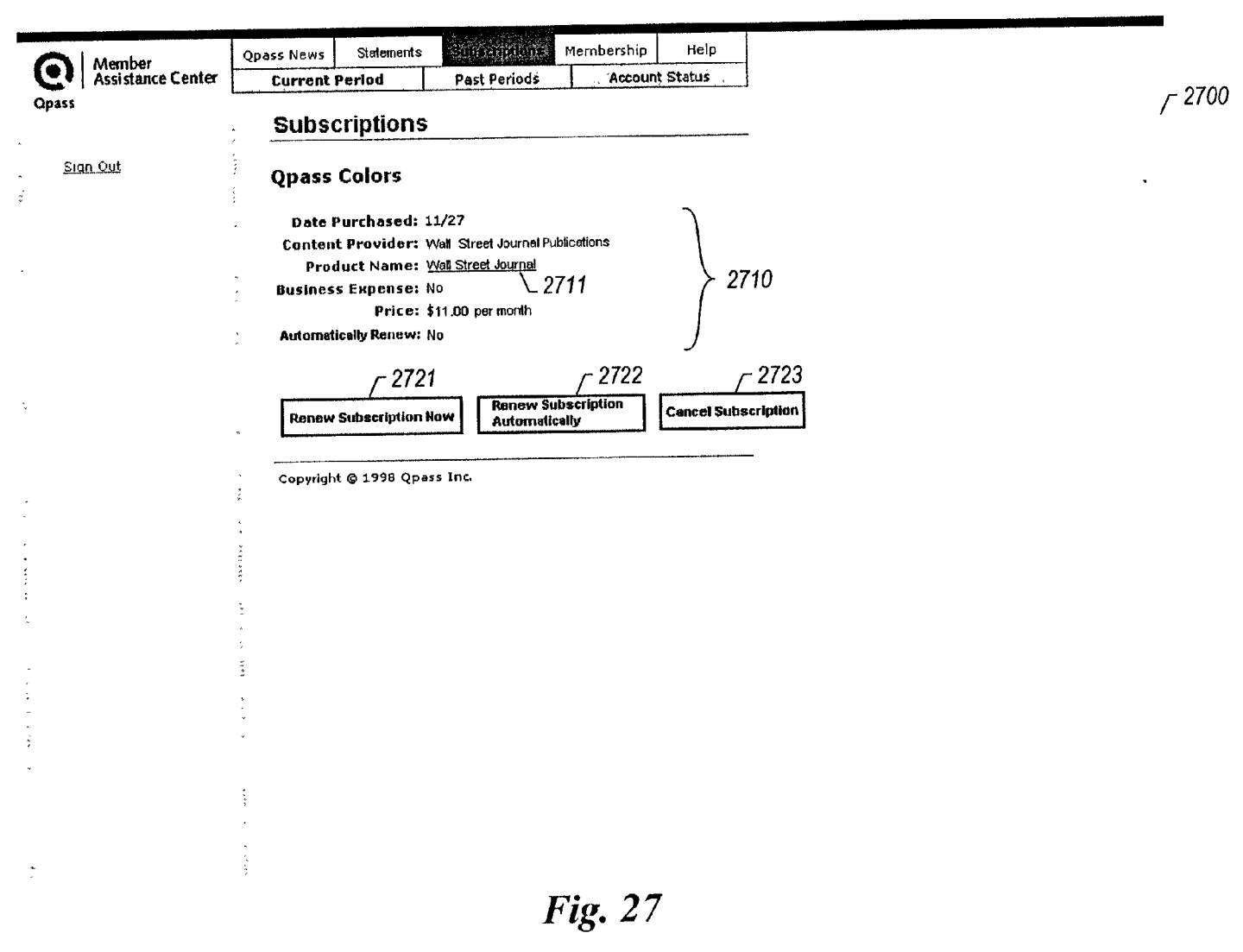

FIGS. 26-27 illustrate the automated, centralized subscription management service preferably provided by the network. FIG. 26 is a screenshot diagram showing a sample subscription management page. The subscription management page 2600 contains entries, such as entries 2610 and 2620, each containing information about a subscription purchased by the customer named "Joe User." For example, entry 2610 in the subscription management page contains information about a subscription to the "Wall Street Journal." Each entry also includes an indication of the expiration date of the subscription, as well as an indication of whether the subscription will automatically renew when it expires.

Each entry includes a link for displaying information about or modifying the subscription. For example, entry 2610 includes link 2611, which the user may activate to display additional information about the Wall Street Journal subscription. FIG. 27 is a screenshot diagram showing a sample subscription information page. The subscription information page 2700 includes information 2710 about the subscription. This information includes a link 2711 that can be activated to access the subscription. The item information page also includes buttons 2721-2723 for modifying the subscription. The user may activate button 2721 to immediately renew the subscription for another term. When button 2721 is activated, the network updates the subscription management and subscription information pages to extend the expiration date of the subscription by the length of a term, and notifies the transaction engine at the merchant site to update the status of the subscription. The user may activate button 2722 to specify that the subscription should automatically renew for another term when the present term expires. When button 2722 is activated the network updates the subscription management and subscription information pages to indicate that the subscription will automatically renew, and notifies the transaction engine at the merchant site to update the status of the subscription. The user may activate button 2723 to cancel the subscription. When button 2722 is activated, the network preferably credits the customer's account for a pro-rated portion of the subscription price. The network further updates the subscription management page to remove the entry for this subscription, and notifies the transaction engine at the merchant site to update the status of the subscription.

As a result a customer may conveniently perform subscription management operations without interacting directly with a human customer service representative. Further, the network relieves its operator of any need to expend customer service representative time to process subscription management operations.

In order to facilitate purchasing by multiple customers who pay for purchases together, the network preferably provides a feature in which it associates multiple purchasing accounts with a single payment account. This feature enables a company to pay for and track the purchases of its employees, a parent to pay for and track the purchases of his or her children, or an individual to separate his or her business purchases from his or her personal purchases. In accordance with this feature, a first customer may register as described above, in order to obtain both a purchasing account for purchasing items, and a payment account for paying for those purchases. At a later time, the first customer may create additional purchasing accounts that are "associated" with the payment account, either for others, or for himself or herself. Any purchases made with an additional purchasing account are consumed using the additional purchasing account, and are billed to the associated payment account, using the payment information associated with this payment account.

Figure 29:
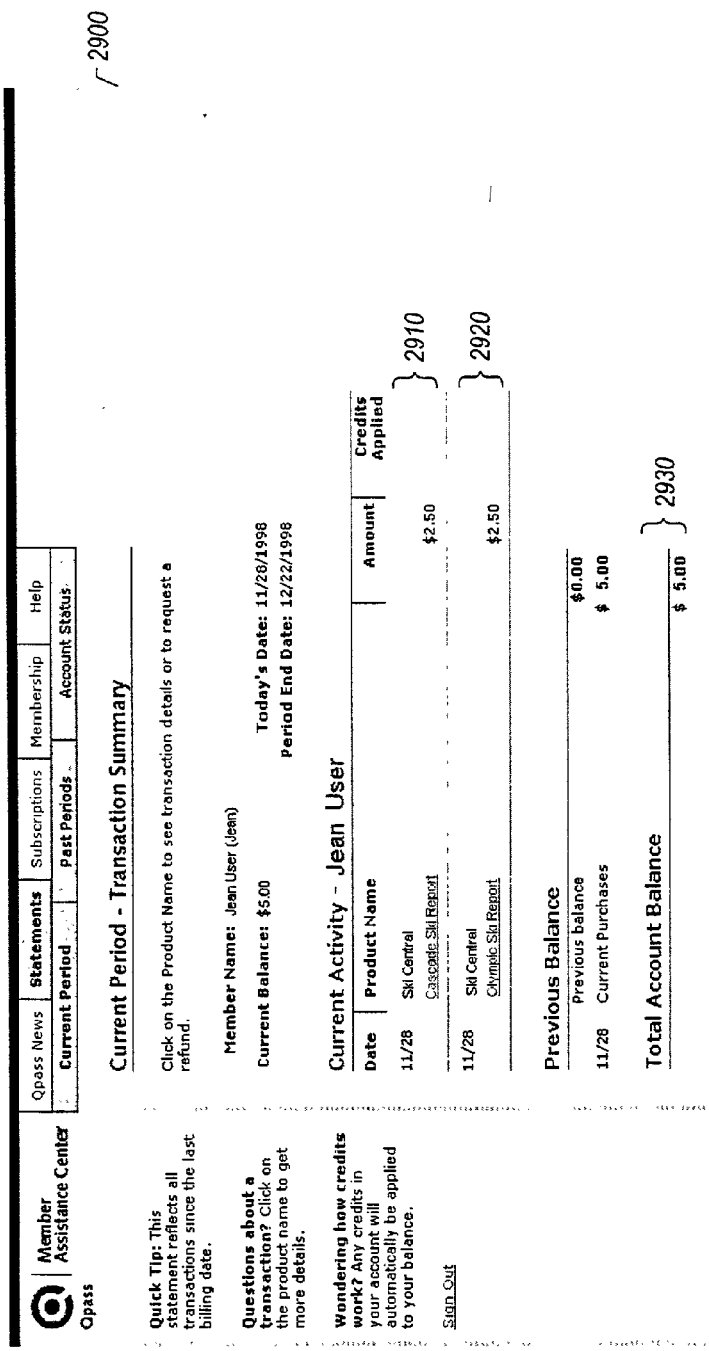
FIG. 29 is a screenshot diagram showing a sample customer statement showing purchases made with the additional purchasing account.

FIGS. 28-30 illustrate the multiple purchasing accounts feature preferably provided by the network. In a preferred embodiment, an additional purchasing account can be added to an existing payment account by a customer signed on to an existing purchasing account associated with the payment account. FIG. 28 is a screenshot diagram showing a sample registration page for registering an additional purchasing account for an existing payment account. In the example, the registration page shown is used by the customer named "Joe User" to add an additional purchasing account for "Jean User" to his existing payment account. The registration page contains fields 2810 into which the customer enters information about the customer that will use the additional purchasing account, including the email address of this customer, and the user name and password to be used with the additional purchasing account. After entering this information, the customer activates button 2820 to register the additional purchasing account.

After the additional purchasing account has been registered, it may be used by Jean User to purchase items. FIG. 29 is a screenshot diagram showing a sample customer statement showing purchases made with the additional purchasing account. The customer statement 2900 contains entries 2910 and 2920 for items purchased by Jean User using her purchasing account. The customer statement further contains a total 2930 of the items that Jean User has purchased. It should be noted that, in the preferred embodiment shown, items purchased using other purchasing accounts associated with the same payment account (e.g., those purchased by Joe User using his purchase account, shown in FIG. 21) are not shown on the customer statement or included in the total.

On the other hand, customers signed on to the payment account (or to the first purchasing account, which is preferably more tightly coupled to the payment account than are additional purchasing accounts) may display the purchases made using other customer accounts associated with the same payment account. FIG. 30 is a screenshot diagram showing a sample customer statement showing purchases made with multiple purchasing accounts that are each associated with the same payment account. The customer statement 3000 includes both entries 3010 and 3020 describing purchases made by Joe User using his purchasing account, and entries 3030 and 3040 describing purchases made by Jean User using her purchasing account. Additionally, the customer statement shows a total 3050 that reflects the purchases made by both Joe User and Jean User. It can be seen that this statement permits a user of a payment account to review the purchases made using all of the purchasing accounts associated with the payment account, and to determine the amount that will requested in the next payment request generated by the network for the payment account.

While this invention has been shown and described with reference to preferred embodiments, it will be understood by those skilled in the art that various changes or modifications in form and detail may be made without departing from the scope of the invention. For example, instead of operating in conjunction with multiple merchants, the network may operate in conjunction with a single merchant. Further, the functionalities provided by the network may be allocated differently across the described computer systems, or may be provided by a different combination of computer systems than described. Further, these computer systems may be connected by a combination of different networks, instead of by a single network such as the Internet. The network may further be reconfigured to more optimally perform in particular business environments. Additionally, the network may be used to sell goods and services other than digital goods, including physical goods. Also, the network may preferably accept payment information and generate payment requests for any form of payment, or any combination of different forms of payment.

We claim:

1. A method, comprising:
registering a user at a first online service by:
obtaining for the user a non-unique member identifier, where the non-unique member identifier is specified by the user and is used by the user to identify the user to a second online service distinct from the first online service, and where the non-unique identifier is the same as a second member identifier obtained for a second registered user which is used to identify the second registered user to a third online service distinct from the first online service and the second online service; and
after obtaining the non-unique member identifier, storing a unique identifier for the user on the user computer system in conjunction with the obtained non-unique member identifier within a cookie of the user computer system;
identifying the user at the first online service by reading from the cookie of the user computer system the non-unique member identifier and the unique identifier stored in conjunction with the non-unique member identifier; and
authenticating the user to the first online service utilizing the non-unique member identifier, the unique identifier, and a password of the user, where such authentication includes comparing the non-unique member identifier and unique identifier to an entry in a database, and comparing the password of the user to a password in the database if the non-unique member identifier and the unique identifier correspond to the entry in the database, where comparing the non-unique member identifier and unique identifier and comparing the password of the user are performed after the non-unique member identifier, the unique identifier, and the password of the user are collected;

wherein a plurality of users having a same user computer system are registered by repeating the registering for each of the plurality of users, where the same user computer system includes a single computer;

wherein the unique identifier includes an electronic mail address.

2. The method of claim 1 wherein obtaining for the user the non-unique member identifier used by the user to identify the user to the second online service comprises obtaining the non-unique member identifier from an operator of the second online service.

3. The method of claim 1 wherein after the authentication a second cookie documenting customer authentication is stored on the user computer system, where the second cookie includes a date and time of authentication.

4. The method of claim 1 wherein the non-unique member identifier is obtained by the user activating a register link and entering the non-unique member identifier and the password utilizing a registration dialog.

5. The method of claim 1 further comprising identifying a plurality of unbilled purchase transaction records resulting from purchases made by the user at a plurality of different sites associated with the first online service, comparing a total transaction cost associated with the plurality of unbilled purchase transaction records to a threshold value, and generating a payment request requesting payment of the total transaction cost.

6. A computer program embodied on a non-transitory computer readable medium comprising:

computer code for registering a user at a first online service by:

obtaining for the user a non-unique member identifier, where the non-unique member identifier is specified by the user and is used by the user to identify the user to a second online service distinct from the first online service, and where the non-unique identifier is the same as a second member identifier obtained for a second registered user which is used to identify the second registered user to a third online service distinct from the first online service and the second online service; and after obtaining the non-unique member identifier, storing a unique identifier for the user on the user computer system in conjunction with the obtained non-unique member identifier within a cookie of the user computer system;

computer code for identifying the user at the first online service by reading from the cookie of the user computer system the non-unique member identifier and the unique identifier stored in conjunction with the non-unique member identifier; and computer code for authenticating the user to the first online service utilizing the non-unique member identifier, the unique identifier, and a password of the user, where such authentication includes comparing the non-unique member identifier and unique identifier to an entry in a database, and comparing the password of the user to a password in the database if the non-unique member identifier and the unique identifier correspond to the entry in the database, where comparing the non-unique member identifier and unique identifier and comparing the password of the user are performed after the non-unique member identifier, the unique identifier, and the password of the user are collected;

wherein a plurality of users having a same user computer system are registered by repeating the registering for each of the plurality of users, where the same user computer system includes a single computer;

wherein the unique identifier includes an electronic mail address.

7. The computer program of claim 6 wherein obtaining for the user the non-unique member identifier used by the user to identify the user to the second online service comprises obtaining the non-unique member identifier from an operator of the second online service.

8. A system, comprising:

a processor coupled to memory, the processor configured to: register a user at a first online service by:

obtaining for the user a non-unique member identifier, where the non-unique member identifier is specified by the user and is used by the user to identify the user to a second online service distinct from the first online service, and where the non-unique identifier is the same as a second member identifier obtained for a second registered user which is used to identify the second registered user to a third online service distinct from the first online service and the second online service; and after obtaining the non-unique member identifier, storing a unique identifier for the user on the user computer system in conjunction with the obtained non-unique member identifier within a cookie of the user computer system;

identify the user at the first online service by reading from the cookie of the user computer system the non-unique member identifier and the unique identifier stored in conjunction with the non-unique member identifier; and authenticate the user to the first online service utilizing the non-unique member identifier, the unique identifier, and a password of the user, where such authentication includes comparing the non-unique member identifier and unique identifier to an entry in a database, and comparing the password of the user to a password in the database if the non-unique member identifier and the unique identifier correspond to the entry in the database, where comparing the non-unique member identifier and unique identifier and comparing the password of the user are performed after the non-unique member identifier, the unique identifier, and the password of the user are collected;

wherein a plurality of users having a same user computer system are registered by repeating the registering for each of the plurality of users, where the same user computer system includes a single computer;

wherein the unique identifier includes an electronic mail address.

* * * * *